United States Patent
Epelbaum

(10) Patent No.: US 9,811,504 B1
(45) Date of Patent: Nov. 7, 2017

(54) LIFESPAN IN MULTIVARIABLE BINARY REGRESSION ANALYSES OF MORTALITY AND SURVIVORSHIP

(71) Applicant: Michael Epelbaum, Nashville, TN (US)

(72) Inventor: Michael Epelbaum, Nashville, TN (US)

( * ) Notice: Subject to any disclaimer, the term of this patent is extended or adjusted under 35 U.S.C. 154(b) by 0 days.

(21) Appl. No.: 15/607,598

(22) Filed: May 29, 2017

Related U.S. Application Data

(63) Continuation-in-part of application No. 14/536,238, filed on Nov. 7, 2014, now abandoned.

(60) Provisional application No. 61/962,502, filed on Nov. 8, 2013.

(51) Int. Cl.
*G06F 17/18* (2006.01)

(52) U.S. Cl.
CPC .................................. *G06F 17/18* (2013.01)

(58) Field of Classification Search
None
See application file for complete search history.

(56) References Cited

U.S. PATENT DOCUMENTS

| | | | |
|---|---|---|---|
| 7,794,957 B2 | 9/2010 | Kenyon et al. | |
| 8,417,541 B1 | 4/2013 | Kramer | |
| 8,645,966 B2 | 2/2014 | Andrade et al. | |
| 9,152,921 B2 | 10/2015 | Chu et al. | |
| 9,443,194 B2 | 9/2016 | Chu et al. | |
| 2004/0064299 A1* | 4/2004 | Mark | G01N 21/274 703/13 |
| 2007/0239368 A1* | 10/2007 | Marrano | G06Q 10/06 702/34 |
| 2011/0027783 A1* | 2/2011 | Schreiber | C12Q 1/6876 435/6.1 |
| 2011/0199084 A1* | 8/2011 | Hasan | A61B 5/055 324/309 |
| 2012/0041575 A1* | 2/2012 | Maeda | G05B 23/024 700/80 |
| 2013/0040846 A1* | 2/2013 | Wheeler | C12Q 1/6883 506/9 |
| 2013/0110409 A1* | 5/2013 | Sakurada | A61B 5/14546 702/19 |

OTHER PUBLICATIONS

Epelbaum, Michael. 2014. "Lifespan and aggregate size variables in specifications of mortality or survivorship." PLoS One 9(1):e84156.
Gündüz, Necla and Ernest Fokoué. 2015. "On the predictive properties of binary link functions." arXiv:1502.04742v1.

* cited by examiner

*Primary Examiner* — Kenny Lin

(57) ABSTRACT

Methods, systems, and computer program products are hereby claimed for including and distinguishing independent variables that denote lifespan in multivariable binary regression analyses of mortality and survivorship. These methods, systems, and computer program products are demonstrated here by including and distinguishing lifespan in multivariable binary regression analyses of humans' and medflies' mortality and survivorship, revealing advantages for the description, specification, measurement, analysis, explanation, and prediction of mortality and survivorship.

16 Claims, 27 Drawing Sheets

FIG. 2

SETTING AND USING PART OF A COMPUTING ENVIRONMENT

. do "C:\DOCUME~1\ADMINI~1\LOCALS~1\Temp\STD00000000.tmp"

. set mem 700m
. set matsize 2000

Current memory allocation

| settable | current value | description | memory usage (1M = 1024k) |
|---|---|---|---|
| set maxvar | 5000 | max. variables allowed | 1.909M |
| set memory | 700M | max. data space | 700.000M |
| set matsize | 2000 | max. RHS vars in models | 30.685M |
| | | | 732.594M |

.use "C:\Documents and Settings\Administrator\My Documents\Stata2010\Data\SweedenMarch2011.dta", clear

FIG. 3

Variables, denotations, and selected data employed in multivariable binary regression analyses of humans' mortality and survivorship

| $i$ | $j$ | $M_{ij}$ | $S_{ij}$ | $A_{ij}$ | $L_{ij}$ | $C_{ij}$ | $\Lambda_{ij}$ | $H_{ij}$ | $G_{ij}$ |
|---|---|---|---|---|---|---|---|---|---|
| smalln | situ | died1 | survived1 | age05 | vita05 | agesexexp | deaths | curyr05 | female |
| 1 | 1 | 1 | 0 | 0.5 | 0.5 | 27866.47 | 6519 | 0.5 | 0 |
| 2 | 1 | 0 | 1 | 0.5 | 1.5 | 27866.47 | 1408.92 | 0.5 | 0 |
| 2 | 2 | 1 | 0 | 1.5 | 1.5 | 25708.38 | 1408.92 | 1.5 | 0 |
| 3 | 1 | 0 | 1 | 0.5 | 2.5 | 27866.47 | 1316.11 | 0.5 | 0 |
| 3 | 2 | 0 | 1 | 1.5 | 2.5 | 25708.38 | 1316.11 | 1.5 | 0 |
| 3 | 3 | 1 | 0 | 2.5 | 2.5 | 26029.16 | 1316.11 | 2.5 | 0 |
| 4 | 1 | 0 | 1 | 0.5 | 3.5 | 27866.47 | 1097.93 | 0.5 | 0 |
| 4 | 2 | 0 | 1 | 1.5 | 3.5 | 25708.38 | 1097.93 | 1.5 | 0 |
| 4 | 3 | 0 | 1 | 2.5 | 3.5 | 26029.16 | 1097.93 | 2.5 | 0 |
| 4 | 4 | 1 | 0 | 3.5 | 3.5 | 26381.62 | 1097.93 | 3.5 | 0 |
| ⋮ | ⋮ | ⋮ | ⋮ | ⋮ | ⋮ | ⋮ | ⋮ | ⋮ | ⋮ |
| 8 | 1 | 0 | 1 | 0.5 | 7.5 | 27866.47 | 146.89 | 0.5 | 0 |
| 8 | 2 | 0 | 1 | 1.5 | 7.5 | 25708.38 | 146.89 | 1.5 | 0 |
| 8 | 3 | 0 | 1 | 2.5 | 7.5 | 26029.16 | 146.89 | 2.5 | 0 |
| 8 | 4 | 0 | 1 | 3.5 | 7.5 | 26381.62 | 146.89 | 3.5 | 0 |
| 8 | 5 | 0 | 1 | 4.5 | 7.5 | 22955.34 | 146.89 | 4.5 | 0 |
| 8 | 6 | 0 | 1 | 5.5 | 7.5 | 20164.64 | 146.89 | 5.5 | 0 |
| ⋮ | ⋮ | ⋮ | ⋮ | ⋮ | ⋮ | ⋮ | ⋮ | ⋮ | ⋮ |
| 2713 | 1 | 0 | 1 | 89.5 | 93.5 | 653.28 | 52.01 | 129.5 | 1 |
| 2713 | 2 | 0 | 1 | 90.5 | 93.5 | 473.85 | 52.01 | 130.5 | 1 |
| 2713 | 3 | 0 | 1 | 91.5 | 93.5 | 335.84 | 52.01 | 131.5 | 1 |
| 2713 | 4 | 0 | 1 | 92.5 | 93.5 | 226.19 | 52.01 | 132.5 | 1 |
| 2713 | 5 | 1 | 0 | 93.5 | 93.5 | 150.8 | 52.01 | 133.5 | 1 |
| 2714 | 1 | 0 | 1 | 0.5 | 4.5 | 60364.11 | 576.06 | 130.5 | 1 |
| ⋮ | ⋮ | ⋮ | ⋮ | ⋮ | ⋮ | ⋮ | ⋮ | ⋮ | ⋮ |

FIG. 4

A COMPUTER PROGRAM FOR REGRESSION ANALYSIS OF HUMANS' MORTALITY

```
. use "C:\Documents and Settings\Administrator\My
Documents\Stata2010\Data\SweedenMarch2011.dta", clear . drop a v c e z
. gen a= age05 ^ 0.16
. gen v= vita05 ^ 0.88
. gen c = curyr05 ^ 1.41
. gen e = deaths ^ 0.30
. gen z =  agesexexp ^ 0.75

. set more off

. xtlogit died1 a c.a#c.a  /*
> */ v c.v#c.v  e c.e#c.e  /*
> */  z c.z#c.z c c.c#c.c c.c#c.c#c.c  /*
> */ i.female /*
> */[iweight = deaths], i(smalln) nolog
```

FIG. 5

RESULTS OF A BINARY MULTIVARIABLE REGRESSION ANALYSIS OF HUMANS' MORTALITY

| Random-effects logistic regression | | | | | Number of obs | = 188087 |
|---|---|---|---|---|---|---|
| Group variable: smalln | | | | | Number of groups | = 3653 |
| Random effects u_i ~ Gaussian | | | | | | |
| Obs per group: min =1, avg = 51.5, max = 110 | | | | | | |
| | | | | | Wald chi2(11) | = . |
| Log likelihood = -938491.94 | | | | | Prob > chi2 | = . |
| died1 | Coef. | Std. Err. | z | P>z | 95% Confidence Interval | |
| a | -1074.55 | 1.208563 | -889.12 | 0 | -1076.92 | -1072.19 |
| c.a#c.a | 546.1184 | 0.613552 | 890.09 | 0 | 544.9158 | 547.3209 |
| v | -17.1193 | 0.019416 | -881.73 | 0 | -17.1574 | -17.0813 |
| c.v#c.v | 0.100631 | 0.00012 | 839.59 | 0 | 0.100396 | 0.100866 |
| e | 6.186891 | 0.00919 | 673.25 | 0 | 6.16888 | 6.204902 |
| c.e#c.e | -0.34869 | 0.000512 | -681.26 | 0 | -0.34969 | -0.34768 |
| z | 0.006233 | 2.08E-05 | 299.18 | 0 | 0.006192 | 0.006273 |
| c.z#c.z | -4.39E-07 | 3.42E-09 | -128.68 | 0 | -4.46E-07 | -4.33E-07 |
| c | -0.00784 | 3.58E-05 | -219.24 | 0 | -0.00791 | -0.00777 |
| c.c#c.c | 1.92E-06 | 2.90E-08 | 66.06 | 0 | 1.86E-06 | 1.97E-06 |
| c.c#c.c#c.c | -7.97E-10 | 7.70E-12 | -103.52 | 0 | -8.12E-10 | -7.82E-10 |
| 1.female | -1.12889 | 0.004455 | -253.37 | 0 | -1.13762 | -1.12016 |
| _cons | 511.7836 | 0.577069 | 886.87 | 0 | 510.6526 | 512.9146 |
| /lnsig2u | -14.9712 | 1.646913 | | | -18.1991 | -11.7434 |
| sigma_u | 0.000561 | 0.000462 | | | 0.000112 | 0.002818 |
| rho | 9.57E-08 | 1.58E-07 | | | 3.79E-09 | 2.41E-06 |
| Likelihood-ratio test of rho=0: chibar2(01) = 0.00  Prob >= chibar2 = 1.000 | | | | | | |

FIG. 6

INDIVIDUALIZED PROBABILITIES OF HUMANS' MORTALITY $\pi(M_{ij})$

| $i$ | $j$ | $M_{ij}$ | $A_{ij}$ | $L_{ij}$ | $C_{ij}$ | $\Lambda_{ij}$ | $H_{ij}$ | $G_{ij}$ | $\eta_{ij}$ | $\pi(M_{ij})$ |
|---|---|---|---|---|---|---|---|---|---|---|
| 1 | 1 | 1 | 0.5 | 0.5 | 27866.47 | 6519 | 0.5 | 0 | 7.41 | 0.999395 |
| 2 | 1 | 0 | 0.5 | 1.5 | 27866.47 | 1408.92 | 0.5 | 0 | 1.52 | 0.820632 |
| 2 | 2 | 1 | 1.5 | 1.5 | 25708.38 | 1408.92 | 1.5 | 0 | 0.46 | 0.613212 |
| 3 | 1 | 0 | 0.5 | 2.5 | 27866.47 | 1316.11 | 0.5 | 0 | -12.08 | 0.0000057 |
| 3 | 2 | 0 | 1.5 | 2.5 | 25708.38 | 1316.11 | 1.5 | 0 | -13.14 | 0.0000020 |
| 3 | 3 | 1 | 2.5 | 2.5 | 26029.16 | 1316.11 | 2.5 | 0 | -0.30 | 0.4248712 |
| 4 | 1 | 0 | 0.5 | 3.5 | 27866.47 | 1097.93 | 0.5 | 0 | -25.02 | 0.0000000 |
| 4 | 2 | 0 | 1.5 | 3.5 | 25708.38 | 1097.93 | 1.5 | 0 | -26.08 | 0.0000000 |
| 4 | 3 | 0 | 2.5 | 3.5 | 26029.16 | 1097.93 | 2.5 | 0 | -13.25 | 0.0000018 |
| 4 | 4 | 1 | 3.5 | 3.5 | 26381.62 | 1097.93 | 3.5 | 0 | 1.24 | 0.7753527 |
| ⋮ | ⋮ | ⋮ | ⋮ | ⋮ | ⋮ | ⋮ | ⋮ | ⋮ | ⋮ | ⋮ |
| 8 | 1 | 0 | 0.5 | 7.5 | 27866.47 | 146.89 | 0.5 | 0 | -78.24 | 0.0000000 |
| 8 | 2 | 0 | 1.5 | 7.5 | 25708.38 | 146.89 | 1.5 | 0 | -79.30 | 0.0000000 |
| 8 | 3 | 0 | 2.5 | 7.5 | 26029.16 | 146.89 | 2.5 | 0 | -66.47 | 0.0000000 |
| 8 | 4 | 0 | 3.5 | 7.5 | 26381.62 | 146.89 | 3.5 | 0 | -51.98 | 0.0000000 |
| 8 | 5 | 0 | 4.5 | 7.5 | 22955.34 | 146.89 | 4.5 | 0 | -38.46 | 0.0000000 |
| 8 | 6 | 0 | 5.5 | 7.5 | 20164.64 | 146.89 | 5.5 | 0 | -25.24 | 0.0000000 |
| ⋮ | ⋮ | ⋮ | ⋮ | ⋮ | ⋮ | ⋮ | ⋮ | ⋮ | ⋮ | ⋮ |
| 2713 | 1 | 0 | 89.5 | 93.5 | 653.28 | 52.01 | 129.5 | 1 | -14.88 | 0.0000003 |
| 2713 | 2 | 0 | 90.5 | 93.5 | 473.85 | 52.01 | 130.5 | 1 | -10.84 | 0.0000197 |
| 2713 | 3 | 0 | 91.5 | 93.5 | 335.84 | 52.01 | 131.5 | 1 | -6.79 | 0.0011188 |
| 2713 | 4 | 0 | 92.5 | 93.5 | 226.19 | 52.01 | 132.5 | 1 | -2.76 | 0.0594523 |
| 2713 | 5 | 1 | 93.5 | 93.5 | 150.8 | 52.01 | 133.5 | 1 | 1.28 | 0.7817139 |
| 2714 | 1 | 0 | 0.5 | 4.5 | 60364.11 | 576.06 | 130.5 | 1 | -40.73 | 0.0000000 |
| ⋮ | ⋮ | ⋮ | ⋮ | ⋮ | ⋮ | ⋮ | ⋮ | ⋮ | ⋮ | ⋮ |

FIG. 7

Individualized lifespan-specific probabilities of mortality $\pi(M_{ijL^*})$ of selected individual humans at selected situations and at specific lifespan level $L^*$

| $i$ | $j$ | $M_{ij}$ | $A_{ij}$ | $C_{ij}$ | $\Lambda_{ij}$ | $H_{ij}$ | $G_{ij}$ | $\pi(M_{ijL^*})$ $L^*=0.5$ | $\pi(M_{ijL^*})$ $L^*=40$ | $\pi(M_{ijL^*})$ $L^*=60$ | $\pi(M_{ijL^*})$ $L^*=90$ |
|---|---|---|---|---|---|---|---|---|---|---|---|
| 1 | 1 | 1 | 0.5 | 27866.47 | 6519 | 0.5 | 0 | 1.00 | 0.00 | 0.00 | 0.00 |
| 2 | 1 | 0 | 0.5 | 27866.47 | 1408.92 | 0.5 | 0 | 1.00 | 0.00 | 0.00 | 0.00 |
| 2 | 2 | 1 | 1.5 | 25708.38 | 1408.92 | 1.5 | 0 | 1.00 | 0.00 | 0.00 | 0.00 |
| 3 | 1 | 0 | 0.5 | 27866.47 | 1316.11 | 0.5 | 0 | 1.00 | 0.00 | 0.00 | 0.00 |
| 3 | 2 | 0 | 1.5 | 25708.38 | 1316.11 | 1.5 | 0 | 1.00 | 0.00 | 0.00 | 0.00 |
| 3 | 3 | 1 | 2.5 | 26029.16 | 1316.11 | 2.5 | 0 | 1.00 | 0.00 | 0.00 | 0.00 |
| 4 | 1 | 0 | 0.5 | 27866.47 | 1097.93 | 0.5 | 0 | 1.00 | 0.00 | 0.00 | 0.00 |
| 4 | 2 | 0 | 1.5 | 25708.38 | 1097.93 | 1.5 | 0 | 1.00 | 0.00 | 0.00 | 0.00 |
| 4 | 3 | 0 | 2.5 | 26029.16 | 1097.93 | 2.5 | 0 | 1.00 | 0.00 | 0.00 | 0.00 |
| 4 | 4 | 1 | 3.5 | 26381.62 | 1097.93 | 3.5 | 0 | 1.00 | 0.00 | 0.00 | 0.00 |
| 8 | 1 | 0 | 0.5 | 27866.47 | 146.89 | 0.5 | 0 | 1.00 | 0.00 | 0.00 | 0.00 |
| 8 | 2 | 0 | 1.5 | 25708.38 | 146.89 | 1.5 | 0 | 1.00 | 0.00 | 0.00 | 0.00 |
| 8 | 3 | 0 | 2.5 | 26029.16 | 146.89 | 2.5 | 0 | 1.00 | 0.00 | 0.00 | 0.00 |
| 8 | 4 | 0 | 3.5 | 26381.62 | 146.89 | 3.5 | 0 | 1.00 | 0.00 | 0.00 | 0.00 |
| 8 | 5 | 0 | 4.5 | 22955.34 | 146.89 | 4.5 | 0 | 1.00 | 0.00 | 0.00 | 0.00 |
| 8 | 6 | 0 | 5.5 | 20164.64 | 146.89 | 5.5 | 0 | 1.00 | 0.00 | 0.00 | 0.00 |
| 2713 | 1 | 0 | 89.5 | 653.28 | 52.01 | 129.5 | 1 | 1.00 | 1.00 | 1.00 | 0.03 |
| 2713 | 2 | 0 | 90.5 | 473.85 | 52.01 | 130.5 | 1 | 1.00 | 1.00 | 1.00 | 0.63 |
| 2713 | 3 | 0 | 91.5 | 335.84 | 52.01 | 131.5 | 1 | 1.00 | 1.00 | 1.00 | 0.99 |
| 2713 | 4 | 0 | 92.5 | 226.19 | 52.01 | 132.5 | 1 | 1.00 | 1.00 | 1.00 | 1.00 |
| 2713 | 5 | 1 | 93.5 | 150.8 | 52.01 | 133.5 | 1 | 1.00 | 1.00 | 1.00 | 1.00 |
| 2714 | 1 | 0 | 0.5 | 60364.11 | 576.06 | 130.5 | 1 | 1.00 | 0.00 | 0.00 | 0.00 |

FIG. 8

Individualized lifespan-specific probabilities of mortality or survivorship $\pi(Y_{ijL^*})$ and averaged lifespan-specific probabilities of mortality or survivorship $\pi(Y_{L^*})$ of selected individuals at selected situations and at selected levels of lifespan

| Specific Lifespan | individual $i = 1$ at situation $j = 1$ | | $\pi(Y_{L^*}) =$ average$\{F(\eta_{ijL^*})\}$ | | $\pi(Y_{L^*}) =$ $F\{average(\eta_{ijL^*})\}$ | |
|---|---|---|---|---|---|---|
| $L^*$ | $\pi(M_{ijL^*})$ | $\pi(S_{ijL^*})$ | $\pi(M_{L^*})$ | $\pi(S_{L^*})$ | $\pi(M_{L^*})$ | $\pi(S_{L^*})$ |
| 0.5 | 0.999395 | 0.000605 | 1.00E+00 | 1.78E-11 | 1.00E+00 | 1.78E-11 |
| 1 | 0.416804 | 0.583196 | 8.01E-01 | 0.199229 | 1.00E+00 | 4.12E-08 |
| 3 | 9.96E-13 | 1.00E+00 | 0.090838 | 0.909162 | 3.38E-05 | 0.999966 |
| 6 | 1.96E-28 | 1.00E+00 | 0.01341 | 0.98659 | 6.66E-21 | 1.00E+00 |
| 20 | 9.89E-89 | 1.00E+00 | 0.01341 | 0.986591 | 3.36E-81 | 1.00E+00 |
| 40 | 1.5E-155 | 1.00E+00 | 0.01341 | 0.986591 | 5.04E-148 | 1.00E+00 |
| 60 | 2.6E-207 | 1.00E+00 | 0.01341 | 0.986591 | 8.96E-10 | 1.00E+00 |
| 90 | 8.8E-263 | 1.00E+00 | 0.00978 | 0.990219 | 3.00E-255 | 1.00E+00 |

FIG. 10

Individualized age-specific probabilities of mortality $\pi(M_{ijA^*})$ of selected individual humans in selected situations at specific levels of age $A^*$

| $i$ | $j$ | $M_{ij}$ | $L_{ij}$ | $C_{ij}$ | $A_{ij}$ | $H_{ij}$ | $G_{ij}$ | $\pi(M_{ijA^*})$ $A^* = 0.5$ | $\pi(M_{ijA^*})$ $A^* = 40$ | $\pi(M_{ijA^*})$ $A^* = 60$ | $\pi(M_{ijA^*})$ $A^* = 90$ |
|---|---|---|---|---|---|---|---|---|---|---|---|
| 1 | 1 | 1 | 0.5 | 27866.47 | 6519 | 0.5 | 0 | 1.00 | 1.00 | 1.00 | 1.00 |
| 2 | 1 | 0 | 1.5 | 27866.47 | 1408.92 | 0.5 | 0 | 0.82 | 1.00 | 1.00 | 1.00 |
| 2 | 2 | 1 | 1.5 | 25708.38 | 1408.92 | 1.5 | 0 | 0.73 | 1.00 | 1.00 | 1.00 |
| 3 | 1 | 0 | 2.5 | 27866.47 | 1316.11 | 0.5 | 0 | 0.00 | 1.00 | 1.00 | 1.00 |
| 3 | 2 | 0 | 2.5 | 25708.38 | 1316.11 | 1.5 | 0 | 0.00 | 1.00 | 1.00 | 1.00 |
| 3 | 3 | 1 | 2.5 | 26029.16 | 1316.11 | 2.5 | 0 | 0.00 | 1.00 | 1.00 | 1.00 |
| 4 | 1 | 0 | 3.5 | 27866.47 | 1097.93 | 0.5 | 0 | 0.00 | 1.00 | 1.00 | 1.00 |
| 4 | 2 | 0 | 3.5 | 25708.38 | 1097.93 | 1.5 | 0 | 0.00 | 1.00 | 1.00 | 1.00 |
| 4 | 3 | 0 | 3.5 | 26029.16 | 1097.93 | 2.5 | 0 | 0.00 | 1.00 | 1.00 | 1.00 |
| 4 | 4 | 1 | 3.5 | 26381.62 | 1097.93 | 3.5 | 0 | 0.00 | 1.00 | 1.00 | 1.00 |
| 8 | 1 | 0 | 7.5 | 27866.47 | 146.89 | 0.5 | 0 | 0.00 | 1.00 | 1.00 | 1.00 |
| 8 | 2 | 0 | 7.5 | 25708.38 | 146.89 | 1.5 | 0 | 0.00 | 1.00 | 1.00 | 1.00 |
| 8 | 3 | 0 | 7.5 | 26029.16 | 146.89 | 2.5 | 0 | 0.00 | 1.00 | 1.00 | 1.00 |
| 8 | 4 | 0 | 7.5 | 26381.62 | 146.89 | 3.5 | 0 | 0.00 | 1.00 | 1.00 | 1.00 |
| 8 | 5 | 0 | 7.5 | 22955.34 | 146.89 | 4.5 | 0 | 0.00 | 1.00 | 1.00 | 1.00 |
| 8 | 6 | 0 | 7.5 | 20164.64 | 146.89 | 5.5 | 0 | 0.00 | 1.00 | 1.00 | 1.00 |
| 2713 | 1 | 0 | 93.5 | 653.28 | 52.01 | 129.5 | 1 | 0.00 | 0.00 | 0.00 | 0.00 |
| 2713 | 2 | 0 | 93.5 | 473.85 | 52.01 | 130.5 | 1 | 0.00 | 0.00 | 0.00 | 0.00 |
| 2713 | 3 | 0 | 93.5 | 335.84 | 52.01 | 131.5 | 1 | 0.00 | 0.00 | 0.00 | 0.00 |
| 2713 | 4 | 0 | 93.5 | 226.19 | 52.01 | 132.5 | 1 | 0.00 | 0.00 | 0.00 | 0.00 |
| 2713 | 5 | 1 | 93.5 | 150.8 | 52.01 | 133.5 | 1 | 0.00 | 0.00 | 0.00 | 0.00 |
| 2714 | 1 | 0 | 4.5 | 60364.11 | 576.06 | 130.5 | 1 | 0.00 | 1.00 | 1.00 | 1.00 |

FIG. 11

Individualized age-specific probabilities of mortality or survivorship $\pi(Y_{ijA^*})$ and averaged age-specific probabilities of mortality or survivorship $\pi(Y_{A^*})$ of selected individuals at selected situations and at selected levels of age $A^*$

| Specific Age | individual $i = 1$ at situation $j = 1$ | | $\pi(Y_{A^*}) =$ average$\{F(\eta_{ijA^*})\}$ | | $\pi(M_{A^*}) =$ $F\{average(\eta_{ijA^*})\}$ | |
|---|---|---|---|---|---|---|
| $A^*$ | $\pi(M_{ijA^*})$ | $\pi(S_{ijA^*})$ | $\pi(M_{A^*})$ | $\pi(S_{A^*})$ | $\pi(M_{A^*})$ | $\pi(S_{A^*})$ |
| 0.5 | 0.9993954 | 0.0006045 | 0.4484055 | 0.551595 | 6.10E-09 | 1.00E+00 |
| 1 | 0.962650 | 0.037349 | 0.3313169 | 0.6686831 | 9.51E-11 | 1.00E+00 |
| 3 | 1.0E+00 | 2.26E-12 | 0.6854005 | 0.3145995 | 0.620731 | 0.379269 |
| 6 | 1.00E+00 | 0.00E+00 | 0.9411483 | 0.0588517 | 1.00E+00 | 0.00E+00 |
| 20 | 1.00E+00 | 0.00E+00 | 0.9865914 | 0.0134086 | 1.00E+00 | 0.00E+00 |
| 40 | 1.00E+00 | 0.00E+00 | 0.9865914 | 0.0134086 | 1.00E+00 | 0.00E+00 |
| 60 | 1.00E+00 | 0.00E+00 | 0.9865914 | 0.0134086 | 1.00E+00 | 0.00E+00 |
| 90 | 1.00E+00 | 0.00E+00 | 0.9865916 | 0.0134084 | 1.00E+00 | 0.00E+00 |

FIG. 22

Averaged age-specific probabilities of mortality or survivorship $\pi(Y_{A^*})$ of selected individuals at selected situations and at selected levels of age $A^*$, wherein averages are calculated with respective medians.

| Specific Age | $\pi(Y_{A^*}) =$ average$\{F(\eta_{ijA^*})\}$ | | $\pi(M_{A^*}) =$ F$\{$average$(\eta_{ijA^*})\}$ | |
|---|---|---|---|---|
| $A^*$ | $\pi(M_{A^*})$ | $\pi(S_{A^*})$ | $\pi(M_{A^*})$ | $\pi(S_{A^*})$ |
| 0.5 | 5.10E-06 | 1.00E+00 | 4.99E-06 | 1.00E+00 |
| 1 | 7.95E-08 | 1.00E+00 | 7.79E-08 | 1.00E+00 |
| 3 | 9.99E-01 | 7.64E-04 | 9.99E-01 | 7.46E-04 |
| 6 | 1.00E+00 | 0.00E+00 | 1.00E+00 | 0.00E+00 |
| 20 | 1.00E+00 | 0.00E+00 | 1.00E+00 | 0.00E+00 |
| 40 | 1.00E+00 | 0.00E+00 | 1.00E+00 | 0.00E+00 |
| 60 | 1.00E+00 | 0.00E+00 | 1.00E+00 | 0.00E+00 |
| 90 | 1.00E+00 | 0.00E+00 | 1.00E+00 | 0.00E+00 |

FIG. 23

Variables, denotations, and selected data employed in multivariable binary regression analyses of medflies' mortality and survivorship

| $i$ | $j$ | $M_{ij}$ | $S_{ij}$ | $A_{ij}$ | $L_{ij}$ | $\Lambda_{ij}$ | $C_{ij}$ | $E_{ij}$ | $G_{ij}$ |
|---|---|---|---|---|---|---|---|---|---|
| casenum | situ | died1 | survived1 | age05 | vita05 | died | alive | cages | female |
| 555 | 1 | 1 | 0 | 0.5 | 0.5 | 1 | 3982 | 11 | 0 |
| 556 | 1 | 0 | 1 | 0.5 | 1.5 | 16 | 3982 | 11 | 0 |
| 556 | 2 | 1 | 0 | 1.5 | 1.5 | 16 | 3981 | 11 | 0 |
| 557 | 1 | 0 | 1 | 0.5 | 2.5 | 15 | 3982 | 11 | 0 |
| 557 | 2 | 0 | 1 | 1.5 | 2.5 | 15 | 3981 | 11 | 0 |
| 557 | 3 | 1 | 0 | 2.5 | 2.5 | 15 | 3965 | 11 | 0 |
| 558 | 1 | 0 | 1 | 0.5 | 3.5 | 24 | 3982 | 11 | 0 |
| 558 | 2 | 0 | 1 | 1.5 | 3.5 | 24 | 3981 | 11 | 0 |
| 558 | 3 | 0 | 1 | 2.5 | 3.5 | 24 | 3965 | 11 | 0 |
| 558 | 4 | 1 | 0 | 3.5 | 3.5 | 24 | 3950 | 11 | 0 |
| : | : | : | : | : | : | : | : | : | : |
| 3184 | 1 | 0 | 1 | 32.5 | 40.5 | 48 | 1182 | 51 | 0 |
| 3184 | 2 | 0 | 1 | 33.5 | 40.5 | 48 | 1075 | 51 | 0 |
| 3184 | 3 | 0 | 1 | 34.5 | 40.5 | 48 | 974 | 51 | 0 |
| 3184 | 4 | 0 | 1 | 35.5 | 40.5 | 48 | 845 | 51 | 0 |
| 3184 | 5 | 0 | 1 | 36.5 | 40.5 | 48 | 785 | 51 | 0 |
| 3184 | 6 | 0 | 1 | 37.5 | 40.5 | 48 | 699 | 51 | 0 |
| 3184 | 7 | 0 | 1 | 38.5 | 40.5 | 48 | 640 | 51 | 0 |
| 3184 | 8 | 0 | 1 | 39.5 | 40.5 | 48 | 562 | 51 | 0 |
| 3184 | 9 | 1 | 0 | 40.5 | 40.5 | 48 | 505 | 51 | 0 |
| 3184 | 10 | 0 | 1 | 32.5 | 40.5 | 48 | 1182 | 51 | 0 |
| : | : | : | : | : | : | : | : | : | : |

FIG. 24

A COMPUTER PROGRAM FOR REGRESSION ANALYSIS OF MEDFLIES' SURVIVORSHIP

. use "C:\Documents and Settings\Administrator\My Documents\Stata2010\Data\fliesMarch2011.dta", clear . gen a= age05 ^ 0.16

. gen v= vita05 ^ 0.94

. gen e=died ^ 0.88

. gen z =alive ^1.02

. xtcloglog survived1 a c.a#c.a  /*
> */ v c.v#c.v  e c.e#c.e i.cages /*
> */ z c.z#c.z i.female /*
> */ [iweight = died], i(casenum) nolog

FIG. 25

RESULTS OF A REGRESSION ANALYSIS OF MEDFLIES' SURVIVORSHIP

| Random-effects complementary log-log model | | | | Number of obs = 50719 | |
|---|---|---|---|---|---|
| Group variable: casenum | | | | Number of groups = 1591 | |
| Random effects u_i ~ Gaussian | | | | | |
| Obs per group: min = 1 , avg = 31.9, max = 76 | | | | | |
| | | | | Wald chi2(21)   = 12730.24 | |
| Log likelihood  =  -5435.42 | | | | Prob > chi2  =  0.0000 | |
| survived1 | Coef. | Std. Err. | z | P>z | 95% Confidence Interval | |
| a | 1402.486 | 14.67483 | 95.57 | 0 | 1373.723 | 1431.248 |
| c.a#c.a | -706.621 | 7.484498 | -94.41 | 0 | -721.29 | -691.951 |
| v | 19.23612 | 0.212374 | 90.58 | 0 | 18.81988 | 19.65237 |
| c.v#c.v | -0.11759 | 0.001355 | -86.8 | 0 | -0.12025 | -0.11493 |
| e | 0.112845 | 0.002865 | 39.38 | 0 | 0.10723 | 0.118461 |
| c.e#c.e | -0.00049 | 1.38E-05 | -35.57 | 0 | -0.00052 | -0.00046 |
| cages | | | | | | |
| 13 | 0.964724 | 0.10298 | 9.37 | 0 | 0.762886 | 1.166561 |
| 15 | -0.66944 | 0.121445 | -5.51 | 0 | -0.90747 | -0.43141 |
| 17 | -1.03296 | 0.102814 | -10.05 | 0 | -1.23448 | -0.83145 |
| 24 | -0.74903 | 0.115518 | -6.48 | 0 | -0.97544 | -0.52262 |
| : | : | : | : | : | : | : |
| 56 | -1.1248 | 0.131534 | -8.55 | 0 | -1.3826 | -0.867 |
| 57 | -0.53327 | 0.109138 | -4.89 | 0 | -0.74718 | -0.31936 |
| z | 0.004073 | 0.000101 | 40.4 | 0 | 0.003875 | 0.004271 |
| c.z#c.z | -4.03E-07 | 1.49E-08 | -26.99 | 0 | -4.32E-07 | -3.74E-07 |
| 1.female | 1.282721 | 0.041707 | 30.76 | 0 | 1.200977 | 1.364465 |
| _cons | -732.741 | 7.57595 | -96.72 | 0 | -747.59 | -717.893 |
| /lnsig2u | -13.5555 | 6.943006 | | | -27.1635 | 0.05254 |
| sigma_u | 0.001139 | 0.003954 | | | 1.26E-06 | 1.026618 |
| rho | 7.88E-07 | 5.47E-06 | | | 9.70E-13 | 0.390512 |
| Likelihood-ratio test of rho=0: chibar2(01) =  8.6e-04     Prob >= chibar2 = 0.488 | | | | | | |

FIG. 26

Selected individualized probabilities of medflies' survivorship $\pi(S_{ij})$

| $i$ | $j$ | $M_{ij}$ | $S_{ij}$ | $A_{ij}$ | $L_{ij}$ | $\Lambda_{ij}$ | $C_{ij}$ | $E_{ij}$ | $G_{ij}$ | $\eta_{ij}$ | $\pi(S_{ij})$ |
|---|---|---|---|---|---|---|---|---|---|---|---|
| 555 | 1 | 1 | 0 | 0.5 | 0.5 | 1 | 3982 | 11 | 0 | -22.90 | 0.00 |
| 556 | 1 | 0 | 1 | 0.5 | 1.5 | 16 | 3982 | 11 | 0 | -3.89 | 0.02 |
| 556 | 2 | 1 | 0 | 1.5 | 1.5 | 16 | 3981 | 11 | 0 | -1.13 | 0.28 |
| 557 | 1 | 0 | 1 | 0.5 | 2.5 | 15 | 3982 | 11 | 0 | 12.99 | 1.00 |
| 557 | 2 | 0 | 1 | 1.5 | 2.5 | 15 | 3981 | 11 | 0 | 15.75 | 1.00 |
| 557 | 3 | 1 | 0 | 2.5 | 2.5 | 15 | 3965 | 11 | 0 | 0.33 | 0.75 |
| 558 | 1 | 0 | 1 | 0.5 | 3.5 | 24 | 3982 | 11 | 0 | 29.87 | 1.00 |
| 558 | 2 | 0 | 1 | 1.5 | 3.5 | 24 | 3981 | 11 | 0 | 32.63 | 1.00 |
| 558 | 3 | 0 | 1 | 2.5 | 3.5 | 24 | 3965 | 11 | 0 | 17.21 | 1.00 |
| 558 | 4 | 1 | 0 | 3.5 | 3.5 | 24 | 3950 | 11 | 0 | -0.68 | 0.40 |
| ⋮ | ⋮ | ⋮ | ⋮ | ⋮ | ⋮ | ⋮ | ⋮ | ⋮ | ⋮ | ⋮ | ⋮ |
| 3184 | 1 | 0 | 1 | 32.5 | 40.5 | 48 | 1182 | 51 | 0 | 68.73 | 1.00 |
| 3184 | 2 | 0 | 1 | 33.5 | 40.5 | 48 | 1075 | 51 | 0 | 59.27 | 1.00 |
| 3184 | 3 | 0 | 1 | 34.5 | 40.5 | 48 | 974 | 51 | 0 | 49.95 | 1.00 |
| 3184 | 4 | 0 | 1 | 35.5 | 40.5 | 48 | 845 | 51 | 0 | 40.62 | 1.00 |
| 3184 | 5 | 0 | 1 | 36.5 | 40.5 | 48 | 785 | 51 | 0 | 31.68 | 1.00 |
| 3184 | 6 | 0 | 1 | 37.5 | 40.5 | 48 | 699 | 51 | 0 | 22.73 | 1.00 |
| 3184 | 7 | 0 | 1 | 38.5 | 40.5 | 48 | 640 | 51 | 0 | 14.01 | 1.00 |
| 3184 | 8 | 0 | 1 | 39.5 | 40.5 | 48 | 562 | 51 | 0 | 5.30 | 1.00 |
| 3184 | 9 | 1 | 0 | 40.5 | 40.5 | 48 | 505 | 51 | 0 | -3.22 | 0.04 |
| 3184 | 10 | 0 | 1 | 32.5 | 40.5 | 48 | 1182 | 51 | 0 | 68.73 | 1.00 |
| ⋮ | ⋮ | ⋮ | ⋮ | ⋮ | ⋮ | ⋮ | ⋮ | ⋮ | ⋮ | ⋮ | ⋮ |

FIG. 27

Individualized lifespan-specific probabilities of survivorship $\pi(S_{ijL^*})$ and averaged lifespan-specific probabilities of survivorship $\pi(S_{L^*})$ of selected individual medflies in selected situations at specific lifespan levels $L^*$

| $i$ | $j$ | $S_{ij}$ | $A_{ij}$ | $C_{ij}$ | $\Lambda_{ij}$ | $E_{ij}$ | $G_{ij}$ | $\pi(S_{ijL^*})$ $L^* = 0.5$ | $\pi(S_{ijL^*})$ $L^* = 10$ | $\pi(S_{ijL^*})$ $L^* = 30$ | $\pi(S_{ijL^*})$ $L^* = 50$ |
|---|---|---|---|---|---|---|---|---|---|---|---|
| 555 | 1 | 0 | 0.5 | 3982 | 1 | 11 | 0 | 0.00 | 1.00 | 1.00 | 1.00 |
| 556 | 1 | 1 | 0.5 | 3982 | 16 | 11 | 0 | 0.00 | 1.00 | 1.00 | 1.00 |
| 556 | 2 | 0 | 1.5 | 3981 | 16 | 11 | 0 | 0.00 | 1.00 | 1.00 | 1.00 |
| 557 | 1 | 1 | 0.5 | 3982 | 15 | 11 | 0 | 0.00 | 1.00 | 1.00 | 1.00 |
| 557 | 2 | 1 | 1.5 | 3981 | 15 | 11 | 0 | 0.00 | 1.00 | 1.00 | 1.00 |
| 557 | 3 | 0 | 2.5 | 3965 | 15 | 11 | 0 | 0.00 | 1.00 | 1.00 | 1.00 |
| 558 | 1 | 1 | 0.5 | 3982 | 24 | 11 | 0 | 0.00 | 1.00 | 1.00 | 1.00 |
| 558 | 2 | 1 | 1.5 | 3981 | 24 | 11 | 0 | 0.00 | 1.00 | 1.00 | 1.00 |
| 558 | 3 | 1 | 2.5 | 3965 | 24 | 11 | 0 | 0.00 | 1.00 | 1.00 | 1.00 |
| 558 | 4 | 0 | 3.5 | 3950 | 24 | 11 | 0 | 0.00 | 1.00 | 1.00 | 1.00 |
| 3184 | 1 | 1 | 32.5 | 1182 | 48 | 51 | 0 | 0.00 | 0.00 | 0.00 | 1.00 |
| 3184 | 2 | 1 | 33.5 | 1075 | 48 | 51 | 0 | 0.00 | 0.00 | 0.00 | 1.00 |
| 3184 | 3 | 1 | 34.5 | 974 | 48 | 51 | 0 | 0.00 | 0.00 | 0.00 | 1.00 |
| 3184 | 4 | 1 | 35.5 | 845 | 48 | 51 | 0 | 0.00 | 0.00 | 0.00 | 1.00 |
| 3184 | 5 | 1 | 36.5 | 785 | 48 | 51 | 0 | 0.00 | 0.00 | 0.00 | 1.00 |
| 3184 | 6 | 1 | 37.5 | 699 | 48 | 51 | 0 | 0.00 | 0.00 | 0.00 | 1.00 |
| 3184 | 7 | 1 | 38.5 | 640 | 48 | 51 | 0 | 0.00 | 0.00 | 0.00 | 1.00 |
| 3184 | 8 | 1 | 39.5 | 562 | 48 | 51 | 0 | 0.00 | 0.00 | 0.00 | 1.00 |
| 3184 | 9 | 0 | 40.5 | 505 | 48 | 51 | 0 | 0.00 | 0.00 | 0.00 | 1.00 |
| 3184 | 10 | 1 | 32.5 | 1182 | 48 | 51 | 0 | 0.00 | 0.00 | 0.00 | 1.00 |
| | | | | | | | | $\pi(S_{L^*})$ | $\pi(S_{L^*})$ | $\pi(S_{L^*})$ | $\pi(S_{L^*})$ |
| $\pi(M_{L^*}) = F\{average(\eta_{ijL^*})\}$ | | | | | | | | 0.00 | 0.00 | 1.00 | 1.00 |
| $\pi(M_{L^*}) = average\{F(\eta_{ijL^*})\}$ | | | | | | | | 0.00 | 0.27 | 0.27 | 1.00 |

LIFESPAN IN MULTIVARIABLE BINARY REGRESSION ANALYSES OF MORTALITY AND SURVIVORSHIP

CROSS-REFERENCE TO RELATED APPLICATIONS

The present application is a continuation-in-part application of U.S. patent application Ser. No. 14/536,238 filed on Nov. 07, 2014 and naming Michael Epelbaum as inventor, said application 14/536,238 claiming benefit, under 35 U.S.C. sctn 119(e), of U.S. Provisional Patent Application No. 61/962,502, filed on Nov. 8, 2013. All of the foregoing applications are hereby incorporated herein by reference in their entirety.

BACKGROUND

Prior Art that Presently Appears Relevant Includes:

U.S. Patent Documents
U.S. Pat. No. 8,417,541 B1 April 2013 Kramer
U.S. Pat. No. 8,645,966 B2 February 2014 Andrade et al.
U.S. Pat. No. 7,794,957 B2 September 2010 Kenyon et al.
U.S. Pat. No. 9,443,194 B2 September 2016 Chu et al.
U.S. Pat. No. 9,152,921 B2 October 2015 Chu et al.
Other Publications
Epelbaum, Michael. 2014. "Lifespan and aggregate size variables in specifications of mortality or survivorship." *PLoS ONE* 9(1):e84156.
Gündüz, Necla and Ernest Fokoué. 2015. "On the predictive properties of binary link functions." *arXiv*:1502.04742v1.

BACKGROUND OF THE INVENTION

This invention relates, in general, to regression analysis of mortality or survivorship, and, more specifically, to including and distinguishing lifespan in multivariable binary regression analysis of mortality or survivorship.

Mortality refers to an individual's cessation of existence, and survivorship refers to an individual's continuation of existence. Therefore, $M_{ij} \in \{0,1\}$, wherein $M_{ij}$ denotes mortality of individual i at situation j, indicating that $M_{ij}$ is a binary variable that adopts one of values 0 and 1, wherein $M_{ij}=1$ denotes that individual i ceases to exist at situation j, and $M_{ij}=0$ denotes that individual i does not cease to exist at situation j. Similarly, $S_{ij} \in \{0,1\}$, wherein $S_{ij}$ denotes survivorship of individual i at situation j, indicating that $S_{ij}$ is a binary variable that adopts one of values 0 and 1, wherein $S_{ij}=1$ denotes that individual i continues to exist at situation j, and $S_{ij}=0$ denotes that individual i does not continue to exist at situation j. Therefore, mortality and survivorship are respective binary phenomena that benefit from multivariable binary regression analyses that usefully describe, specify, measure, analyze, explain, estimate, and predict these phenomena; multivariable binary regression analyses of mortality or survivorship are prevalent and have been shown to be useful in medicine, public affairs, industry, and business.

The multivariable binary regression analysis of one of mortality and survivorship analyzes the relationship between a dependent variable $Y_{ij}$ and independent variables $X_{vij}$ for one of $Y_{ij}=M_{ij}$ and $Y_{ij}=S_{ij}$, utilizing data on N individuals i at respective at least one situation j, and utilizing model $n_{ij}=\beta_0+\beta_v X_{vij}+ \ldots +\beta_W X_{Wij}$ and binary link function $B(n_{ij})$, wherein: i=1:N, indicating that i are sequential positive integers 1 through N; i denotes an individual; N denotes the total number of individuals i in said data; j=1:J, indicating that j are sequential positive integers 1 through J; j denotes a situation of individual i in reference to said variables $X_{vij}$ and $Y_{ij}$; J denotes the total number of situations of an individual i in said data, allowing distinct J for distinct individuals i; $M_{ij}$ denotes the mortality status of individual i at situation j; $S_{ij}$ denotes the survivorship status of individual i at situation j; $Y_{ij} \in \{0,1\}$, indicating that $Y_{ij}$ is a binary variable that adopts one of values 0 and 1 for one of $Y_{ij}=M_{ij}$ and $Y_{ij}=S_{ij}$ of individual i at situation j; $M_{ij}=1$ indicates cessation of existence of individual i at situation j; $M_{ij}=0$ indicates non-cessation of existence of individual i at situation j; $S_{ij}=1$ indicates continuation of existence of individual i at situation j; $S_{ij}=0$ indicates non-continuation of existence of individual i at situation j; 1:W, indicating that v are sequential positive integers 1 through W; W≥2; v denotes an index of each of the following: variables $X_v$, variables $X_{vij}$ of individual i at situation j, and coefficients $\beta_v$; $X_{vij}$ denotes a variable $X_v$ of individual i at situation j; W denotes the total number variables $X_v$, variables $X_{vij}$ of individual i at situation j, and coefficients $\beta_v$; r=1:R, indicating that r are sequential positive integers 1 through R; R≥2; W≥R; r denotes an index of each of the following: variables $K_r$ and variables $K_{rij}$; $K_r$ denotes a variable that directly denotes a distinct phenomenon, and R respective variables $K_r$ respectively directly denote R distinct phenomena; $K_{rij}$ denotes a variable $K_r$ of individual i at situation j; T denotes a transformation function, allowing identity transformation; q=1:Q indicating that q are sequential positive integers 1 through Q; $X_v=T_q(K_r)$; $X_{vij}=T_q(K_{rij})$; Q denotes the total number of transformations $T_q(K_r)$ for a specific $K_r$, and Q also denotes the the total number of transformations $T_q(K_{rij})$ for a specific $K_{rij}$ of individual i at situation j, allowing distinct Q for distinct variables $K_r$, and allowing distinct Q for distinct variables $K_{rij}$ of individual i at situation j; $\beta$ denotes a regression coefficient; and $\beta_0$ denotes the regression coefficient for the intercept, allowing $\beta_0$ to be one of the following: estimated, suppressed, and user-provided.

As noted, multivariable binary regression analysis of mortality and survivorship analyzes the relationship between independent variables $X_{vij}$ and a dependent variable $Y_{ij}$ for a respective individual i at a respective situation j. An "independent" variable is also known as a "predictor," "explanatory," "covariate," or "right-hand side" variable. A "dependent" variable is also known as a "response," "outcome," "explained," or "left-hand side" variable.

As noted in said consideration of the multivariable binary regression analysis of mortality and survivorship, wherein: T denotes a transformation function, allowing identity transformation; q=1:Q, indicating that q are sequential positive integers 1 through Q; r=1:R, indicating that r are sequential positive integers 1 through R; Q denotes the total number of transformations $T_q(K_r)$ for a specific $K_r$, and the total number of transformations $T_q(K_{rij})$ for a specific $K_{rij}$, allowing distinct Q for distinct variables $K_r$ and distinct variables $K_{rij}$; and R denotes the total number of denoted phenomena and denoting variables $K_{rij}$. For example, where $K_{1ij}=A_{ij}$ and where $A_{ij}$ denotes the denoted variable age, relationships $X_{1ij}=T_1(K_{1ij})=(A_{ij})^{0.5}$, $X_{2ij}=T_2(K_{1ij})=(A_{ij})^{-0.7}$, and $X_{3ij}=T_3(K_{1ij})=\ln(A_{ij})$ illustrate nonlinear transformations $X_{vij}=T_q(K_{rij})$ in which respective variables $X_{1ij}$, $X_{2ij}$, and $X_{3ij}$ respectively equal the respective transformations $T_q$ of a denoting variable $A_{ij}$ into three distinct nonlinearly transformed forms of the denoted variable age. Relationship $X_{4ij}=T_4(K_{1ij})=A_{ij}$ illustrates an identity transformation of a denoting variable $A_{ij}$; the identity transformation preserves the identity of the denoting variable (an identity transformation is sometimes conceptualized as no transformation or zero transformation). In these examples, $A_{ij}$ and $K_{1ij}$ directly denote the denoted variable age, but respective variables $X_{1ij}$, $X_{2ij}$, $X_{3ij}$, and $X_{4ij}$ respectively indirectly denote the denoted variable age, wherein q=1 and $K_{1ij} A_{ij}$. However, $X_{5ij} = T_5(K_{2ij}) = G_{ij}$ wherein $G_{ij} \in \{0,1\}$ illustrate a binary transformation in which an independent variable $X_{5ij}$ equals a denoting binary variable $G_{ij}$ that denotes—and gives a mathematical form to—a respective categorical variable gender (or sex), where, for example, $G_{ij}=0$ if individual i is male, but $G_{ij}=1$ if individual i is female, wherein $T_5(K_{2ij}) = G_{ij}$ indicates that r=2, q=5, $K_{2ij}$ directly denotes the denoted variable gender (or sex), and $X_{5ij}$ indirectly denotes the denoted variable gender (or sex). These examples illustrate the sense in which independent variables $X_{vij}$ indirectly denote the variables age and gender (or sex). In these examples, age and gender (or sex) are the denoted variables, respective variables $K_{rij}$, $A_{ij}$, and $G_{ij}$ are the respective directly denoting variables $K_{rij}$ that directly denote the respective denoted variables, whereas respective variables $X_{vij}$ are the indirectly denoting variables that indirectly denote the respective denoted variables. These examples also illustrate the following kinds of transformation: nonlinear (i.e., $T_1$, $T_2$, and $T_3$ in these examples), identity and linear (i.e., $T_4$ in this example), and binary (i.e., $T_5$ in this example). Analysts employ diverse kinds of mathematical transformations of denoted variables, utilizing, for example, polynomial, fractional polynomial, logarithmic, diverse kinds of smoothers (e.g., lowess, splines), and other kinds of mathematical transformations, as considered in some detail in Royston and Sauerbrei (2008). In multivariable binary regression analyses, the analyst selects the following: the denoting variables, the denoted variables, and the transformations that are employed in the respective analyses.

In multivariable binary regression analyses, the analyst also selects the binary link functions that are employed in the respective analyses. $B(n_{ij})$ denotes here the binary link function in the present consideration of the multivariable binary regression analysis of mortality and survivorship. The binary link function is the function that links the linear model (i.e., the model that is denoted here with $n_{ij} = \beta_0 + \beta_v X_{vij} + \ldots + \beta_W X_{Wij}$) to the conditional mean of the dependent variable (i.e., the conditional mean of the dependent variable that is denoted here with $Y_{ij}$ for one of $Y_{ij}=M_{ij}$ and $Y_{ij}=S_{ij}$). Moreover, as will be further elucidated here, the binary link function (denoted here with $B(n_{ij})$) corresponds to a cumulative distribution function (denoted here with $F(n_{ij})$) that enables estimation of probabilities of mortality or survivorship. Diverse binary link functions and corresponding cumulative distribution functions are currently available for use in multivariable binary regression analysis; popular binary link functions are commonly named "logit," "probit," "compit," and "cauchit" (Gündüz and Fokoué 2015). For example, the logistic binary link function that is commonly known as "logit" is denotable with $B(n_{ij})=\ln\{n_{ij}/(1-n_{ij})\}$; logit is the most popular conventional binary link function. Also quite popular is the probit binary link function that is denotable with $B(n_{ij})=\Phi^{-1}(n_{ij})$. Less popular—but quite prevalent and useful—is the complementary log-log binary link function that is commonly known as "compit" and is denotable with $B(n_{ij})=\ln\{-\ln(1-n_{ij})\}$; less popular is the Cauchy binary link function that is commonly known as "cauchit," and is denotable with $B(n_{ij})=\tan\{\pi(n_{ij})-\pi/2\}$; Gündüz and Fokoué(2015) provide detailed consideration of binary link functions and corresponding cumulative distribution functions. These commonly adopted binary link functions have fixed skewness and lack the flexibility to allow the data to determine the degree of skewness; to address this limitation researchers have proposed, for example, parametric, semi-parametric, or non-parametric generalized extreme value binary link functions with unconstrained shape parameters (Li et al. 2016).

Researchers typically search for optimal results in multivariable binary regression analyses of mortality or survivorship; searching, for example, for optimal data, models, denoting variables, denoted variables, transformations, and binary link functions. The search for optimal results typically involves iterations of analyses with diverse input multivariable regression models (i.e., iterations of analyses with diverse variables $X_{vij}$ and diverse kinds of transformations $X_{vij}=T_q(Z_{rij})$) and iterations of analyses with diverse kinds of binary link functions $B(n_{ij})$. The selection of optimal results is typically guided by attempts to optimize prediction, goodness of fit, replicability, or explanation. Diverse tests—employing prediction, goodness of fit, replicability, or explanation criteria—are currently available for the purpose of evaluating results of multivariable binary regression analyses; examples of such tests include pseudo-$R^2$ tests, deviance statistics, likelihood ratio tests, Hosmer-Lemeshow tests, mean predicted fit tests, information criteria tests (such as Akaike Information Criterion (AIC) tests or Bayesian Information Criterion (BIC) tests), simulation studies, and investigations of model stability by bootstrap resampling. These issues are considered in great detail in Hilbe (2009) and Royston and Sauerbrei (2008).

Multivariable binary regression analysis enables estimation of probabilities of mortality or survivorship. An individualized probability of one of mortality and survivorship is denoted here by $\pi(Y_{ij})$ for one of $\pi(Y_{ij})=\pi(M_{ij})$ and $\pi(Y_{ij})=\pi(S_{ij})$, wherein: $\pi(M_{ij})$ denotes the probability of mortality of individual i at situation j, and $\pi(S_{ij})$ denotes the probability of survivorship of individual i at situation j. Estimation of $\pi(Y_{ij})$ for one of $\pi(Y_{ij})=\pi(M_{ij})$ and $\pi(Y_{ij})=\pi(S_{ij})$ utilizes the following: said data on variable $Y_{ij}$ and variables $X_{vij}$, said model $n_{ij}=\beta_0+\beta_v X_{vij}+\ldots+\beta_W X_{Wij}$, said binary link function $B(n_{ij})$, cumulative distribution function $F(n_{ij})$, and $\pi(Y_{ij})=F(n_{ij})$ wherein $F(n_{ij})$ denotes the cumulative distribution function of $n_{ij}$, and wherein function $F(n_{ij})$ corresponds to function $B(n_{ij})$. Respective cumulative distribution functions $F(n_{ij})$ that correspond to respective popular binary link functions $B(n_{ij})$ are denotable as follows: the logit binary link function $B(n_{ij})=\ln\{n_{ij}/(1-n_{ij})\}$ corresponds to a cumulative distribution function $F(n_{ij})=1/\{1+\exp(-n_{ij})\}=\{\exp(n_{ij})\}/\{1+\exp(n_{ij})\}$, the probit binary link function $B(n_{ij})=\Phi^{-1}(n_{ij})$ corresponds to a cumulative distribution function $F(n_{ij})=\Phi(n_{ij})$, the complementary log-log binary link function $B(n_{ij})=\ln\{-\ln(1-n_{ij})\}$ corresponds to a cumulative distribution function $F(n_{ij})=1-\exp\{-\exp(n_{ij})\}$, and the cauchit binary link function $B(n_{ij})=\tan\{\pi(n_{ij})-\pi/2\}$ corresponds to a cumulative distribution function $F(n_{ij})=(1\pi)\{\tan^{-1}(n_{ij})+\pi/2\}$. Therefore, for example, if a multivariable binary regression analysis is analyzed with a logit binary link function $B(n_{ij})$, then the probability of mortality of individual i at situation j that is denoted with $\pi(M_{ij})$ is calculated with $\pi(M_{ij})=F(n_{ij})=1/\{1+\exp(-n_{ij})\}=\{\exp(n_{ij})\}/\{1+\exp(n_{ij})\}$, however, if a multivariable binary regression analysis is analyzed with a complementary log-log binary link function $B(n_{ij})$, then the probability of mortality of individual i at situation j that is denoted with $\pi(M_{ij})$ is calculated with $\pi(M_{ij})=F(n_{ij})=1-\exp\{-\exp(n_{ij})\}$. Less popular cumulative distribution functions that respectively correspond to less popular binary link functions are also available. As noted, Gündüz and Fokoué (2015) provide detailed consideration of binary link functions and cumulative distribution functions.

Individualized probabilities of mortality $\pi(M_{ij})$ and individualized probabilities of survivorship $\pi(S_{ij})$ can be specified further by the specification of specific phenomena (e.g., age, size, sex) that are linked to these probabilities. An individualized specific—e.g., an age-specific, a size-specific, a sex-specific—probability of one of mortality and survivorship is denoted here by $\pi(Y_{ijZ*})$ for one of $\pi(Y_{ijZ*}) = \pi(M_{ijZ*})$ and $\pi(Y_{ijZ*}) = \pi(S_{ijZ*})$. Moreover, individualized specific probabilities of mortality $\pi(M_{ijZ*})$ and individualized probabilities of survivorship $\pi(M_{ijZ*})$ can be specified further by respective averaging. An averaged specific—e.g., an age-specific, a size-specific, a sex-specific—probability of one of mortality and survivorship is denoted here by $\pi(Y_{Z*})$ for one of $\pi(Y_{Z*}) = \pi(M_{Z*})$ and $\pi(Y_{Z*}) = \pi(S_{Z*})$. Estimation of at least one of $\pi(Y_{ijZ*})$ and $\pi(Y_{Z*})$ utilizes $n_{ijZ*} = \beta_0 + \Sigma\beta_v Z^* + \Sigma\beta_v X_{vij-Z}$, estimation of $\pi(Y_{ijZ*})$ also utilizes $\pi(Y_{ijZ*}) = F(n_{ijZ*})$, and estimation of $\pi(Y_{Z*})$ also utilizes at least one of $\pi(Y_{Z*}) = F\{\text{average}(n_{ijZ*})\}$ and $\pi(Y_{Z*}) = \text{average}\{F(n_{ijZ*})\}$, wherein: $\pi(Y_{ijZ*})$ denotes one of $\pi(Y_{ijZ*}) = \pi(M_{ijZ*})$ and $\pi(Y_{ijZ*}) = \pi(S_{ijZ*})$; $\pi(Y_{Z*})$ denotes one of $\pi(Y_{Z*}) = \pi(M_{Z*})$ and $\pi(Y_{Z*}) = \pi(S_{Z*})$; Z denotes a specifically selected variable $K_r$; said variable Z and said specifically selected variable $K_r$ directly denote a specifically selected phenomenon; $Z^*$ denotes a specifically selected value of variable Z; $\pi(M_{ijZ*})$ denotes an individualized specific probability of mortality of individual i at situation j and at a specifically selected value $Z^*$ of variable Z; $\pi(S_{ijZ*})$ denotes an individualized specific probability of survivorship of individual i at situation j and at a specifically selected value $Z^*$ of variable Z; $\pi(M_{Z*})$ denotes an averaged specified probability of mortality at a specifically selected value $Z^*$ of variable Z; $\pi(S_{Z*})$ denotes an averaged specified probability of survivorship at a specifically selected value $Z^*$ of variable Z; $\beta_v Z^*$ denotes a replacement of a $\beta_v X_{vij}$ in said model $n_{ij} = \beta_0 + \beta_v X_{vij} + \ldots + \beta_W X_{Wij}$, wherein variable $K_r$ in $X_{vij} = T_Q(K_{rij})$ is said specific variable $K_r$ that is denoted by Z, and wherein $X_{vij} = T_q(Z_{ij})$ for said replaced $\beta_v X_{vij}$; $\Sigma\beta_v Z^*$ denotes the sum of all respective $\beta_v Z^*$ replacements of respective $\beta_v X_{vij}$ in said model $n_{ij} = \beta_0 + \beta_v X_{vij} + \ldots + \beta_W X_{Wij}$; $X_{vij-Z}$ denotes an $X_{vij}$ wherein variable $K_r$ in $X_{vij} = T_q(K_{rij})$ is not said specific variable $K_r$ that is denoted by Z; $\Sigma\beta_v X_{vij-Z}$ denotes the sum of all $\beta_v X_{vij-Z}$ in said model $n_{ij} = \beta_0 + \beta_v X_{vij} + \ldots + \beta_W X_{Wij}$; $F(\cdot)$ denotes a cumulative distribution function of $(\cdot)$; said cumulative distribution function $F(\cdot)$ corresponds to said binary link function $B(n_{ij})$; average $(n_{ijZ*})$ denotes an average of at least two $n_{ijZ*}$ at a specifically selected value $Z^*$ of variable Z; and average $\{F(n_{ijZ*})\}$ denotes an average of at least two $F(n_{ijZ*})$ at a specifically selected value $Z^*$ of variable Z.

Individualized and averaged specific probabilities of mortality and survivorship can be usefully revealed in specifications and plots of $\pi(Y_{ijZ})$, $\pi(Y_Z)$, $\pi(MS_{ijZ})$, $\pi(MS_Z)$, $\pi(MS_{ijZ+})$, and $\pi(MS_{Z+})$ wherein: $\pi(Y_{ijZ})$ denotes one of $\pi(Y_{ijZ}) = \pi(M_{ijZ})$ and $\pi(Y_{ijZ}) = \pi(S_{ijZ})$; $\pi(Y_Z)$ denotes one of $\pi(Y_Z) = \pi(M_Z)$ and $\pi(Y_Z) = \pi(S_Z)$; $\pi(M_{ijZ})$ denotes at least two $\pi(M_{MijZ*})$, wherein said at least two $\pi(M_{ijZ*})$ denote respective individualized specific probabilities of mortality of individual i at situation j and at at least two specifically selected $Z^*$ values of variable Z; $\pi(S_{ijZ})$ denotes at least two $\pi(S_{ijZ*})$, wherein said at least two $\pi(S_{ijZ*})$ denote respective individualized specific probabilities of survivorship of individual i at situation j and at at least two specifically selected $Z^*$ values of variable Z; $\pi(M_Z)$ denotes at least two $\pi(M_{Z*})$, wherein said at least two $\pi(M_{Z*})$ denote respective averaged specific probabilities of mortality at at least two specifically selected $Z^*$ values of variable Z; $\pi(S_Z)$ denotes at least two $\pi(S_{Z*})$, wherein said at least two $\pi(S_{Z*})$ denote respective averaged specific probabilities of survivorship at at least two specifically selected $Z^*$ values of variable Z; $\pi(MS_{ijZ})$ denotes the combination of corresponding $\pi(M_{ijZ})$ and $\pi(S_{ijZ})$ at at least two specifically selected $Z^*$ values of variable Z; $\pi(MS_Z)$ denotes the combination of corresponding $\pi(M_Z)$ and $\pi(S_Z)$ at at least two specifically selected $Z^*$ values of variable Z; $\pi(MS_{ijZ+})$ denotes the combination of at least two corresponding $\pi(MS_{ijZ})$ at respective at least two specifically selected $Z^*$ values of respective at least two variables Z; and $\pi(MS_{Z+})$ denotes the combination of at least two corresponding $\pi(MS_Z)$ at respective at least two specifically selected $Z^*$ values of respective at least two variables Z.

Currently available multivariable binary regression analyses of mortality or survivorship do not include and distinguish independent variables that indirectly denote lifespan. An individual's lifespan is the total time span of an individual's existence. Lifespan and age are distinct phenomena; an individual's age is a contemporary measurement of an individual's time of existence; age is conventionally calculated by $A_{iq} = t_{iq} - t_{i0}$, whereas lifespan is conventionally calculated by $L_{iq} = L_i = t_{iz} - t_{i0}$, wherein $A_{iq}$ denotes the age of a natural or artificial individual i at time $t_q$, $L_{iq}$ denotes lifespan of a natural or artificial individual i at time $t_q$, z≥q, $t_{i0}$ denotes the time of this individual's initiation of existence, $t_{iq}$ denotes the current time of this individual's existence, and $t_{iz}$ denotes the time of this individual's cessation of existence, such that $A_{iq}$ varies in times $t_{i0}:t_{iz}$ whereas $L_i$ denotes this individual's constant lifespan at all times $t_{i0}:t_{iz}$. The time of birth typically indicates time $t_{i0}$, and the time of death typically indicates time $t_{iz}$, but these typical notions of time of birth and time of death as respective limits of age or lifespan do not apply to all kinds of individuals.

The consideration of lifespan enables consideration of the lifespan aggregate. The lifespan aggregate includes all the individuals that are identically characterized with respect to lifespan and every other condition in a data set. The individuals that are included in a lifespan aggregate begin their existence in coexistence at the beginning of a specific lifespan, they coexist through said lifespan, and they cease to exist and cease to coexist at the conclusion of this lifespan. Therefore, a lifespan aggregate's composition, size, and other characteristics (e.g., beginning or ending time, density) are constant from the time of the initiation of existence of this aggregate (i.e., the initiation of existence of all the individuals that are included in this aggregate) to the time of this aggregate's cessation of existence (i.e., the cessation of existence of all the individuals that are included in this aggregate). In some cases, the lifespan aggregate consists only of a respective single natural or artificial individual, but in many cases the lifespan aggregate consists of more than one individual. An individual's lifespan aggregate is included in every contemporary aggregate of this individual. The contemporary aggregate includes all the individuals that are identically characterized with respect to every condition in a data set at a point of cessation or continuation of existence, except that these individuals share or do not share an identical lifespan. These considerations indicate that the contemporary aggregate's composition, size, or other characteristics (e.g., beginning or ending time, density) are time-specific and changeable through time.

Age, lifespan, lifespan aggregate, and contemporary aggregate are distinct characteristics that characterize every natural or artificial individual at every point of survivorship (i.e., continuation of existence) or mortality (i.e., cessation of existence). Further details on age, lifespan, lifespan aggregate, and contemporary aggregate—and consideration of previous research on these and related phenomena—are available in Epelbaum (2014).

Provisional Patent Application No. 61/962,502, filed on Nov. 08, 2013 by the present inventor, and the inventor's scientific article "Lifespan and aggregate size variables in specifications of mortality or survivorship" (published on Jan. 15, 2014 in PLoS ONE 9(1):e84156 and cited here as Epelbaum (2014)), present the first inclusion and distinction of at least one independent variable that denotes and distinguishes lifespan in multivariable binary regression analyses of mortality or survivorship; Provisional Patent Application No. 61/962,502 and Epelbaum (2014) distinguish between independent variables that respectively denote distinct age and lifespan in multivariable binary regression analyses of mortality or survivorship. Other previous multivariable binary regression analyses of mortality or survivorship did not consider independent variables that distinctly denote lifespan; said other previous investigations also failed to distinguish between independent variables that respectively denote distinct age and lifespan in multivariable binary regression analyses of mortality or survivorship. U.S. Pat. No. 8,417,541 B1 (Kramer 2013) is one of many examples of the absence, exclusion, or omission of independent variables that denote lifespan in multivariable binary regression analyses of mortality or survivorship. Kramer (2103) is also one of many examples of the absence, exclusion, or omission of independent variables that distinguish between independent variables that denote respective distinct age and lifespan in multivariable binary regression analyses of mortality or survivorship. Provisional Patent Application No. 61/962,502 and Epelbaum (2014) are hereby incorporated by reference in their entirety.

Provisional Patent Application No. 61/962,502 and Epelbaum (2014) also present the first inclusion and distinction of an independent variable that denotes lifespan aggregate in multivariable binary regression analyses of mortality or survivorship; Provisional Patent Application No. 61/962,502 and Epelbaum (2014) also distinguish between independent variables that respectively denote distinct lifespan aggregates and contemporary aggregates in multivariable binary regression analyses of mortality or survivorship. Other previous multivariable binary regression analyses of mortality or survivorship did not include and did not distinguish independent variables that denote lifespan aggregate; said other previous analyses also failed to distinguish between independent variables that respectively denote respective distinct lifespan aggregates and contemporary aggregates in multivariable binary regression analyses of mortality or survivorship. Kramer (2013) is one of many examples of the absence, exclusion, or omission of independent variables that denote the lifespan aggregate in multivariable binary regression analyses of mortality or survivorship. Kramer (2103) is also one of many examples of the absence, exclusion, or omission of independent variables that distinguish between independent variables that denote respective distinct lifespan aggregate and contemporary aggregate in multivariable binary regression analyses of mortality or survivorship. As noted, Provisional Patent Application No. 61/962,502 and Epelbaum (2014) are hereby incorporated by reference in their entirety.

Previous research focuses on lifespan as an explanandum, explicandum, left- hand side, outcome, dependent, or response variable that is caused, determined, explained, explicated, or predicted; such focus on lifespan is illustrated, for example, in U.S. Pat. No. 7,794,957 B2 (Kenyon et al. 2010). The focus on lifespan as an explanandum, explicandum, left-hand side, outcome, dependent, or response variable that is caused, determined, explained, explicated, or predicted may have provided one possible motivation for the absence, exclusion, or omission of an explicit right-hand side independent variable that denotes lifespan and is distinct from another independent variable that denotes age in individualized multivariable binary regression analyses of mortality or survivorship.

Inclusions of explicit distinct independent variables that respectively denote distinct age, lifespan, lifespan aggregate, and contemporary aggregate variables offer considerable advantages in multivariable binary regression analyses of mortality or survivorship. The main advantages are that these inclusions could increase explanatory and predictive powers, deepen insights and understanding, and widen the scope of respective analyses—and corresponding conceptions, measurements, and descriptions—of mortality or survivorship.

As noted, multivariable binary regression analyses of mortality or survivorship yield estimated models $n_{ij}=\beta_0+\beta_v X_{vij}+ \ldots +\beta_W X_{Wij}$, individual probabilities $\pi(Y_{ij})$ for one of $\pi(Y_{ij})=\pi(M_{ij})$ and $\pi(Y_{ij})=\pi(S_j)$, and specific probabilities $\pi(Y_Z)$ for one of $\pi(Y_Z)=\pi(M_Z)$ and $\pi(Y_Z)=\pi(S_Z)$ wherein $\pi(Y_{ij})$ denotes the probability of mortality or survivorship of individual i at situation j, $\pi(Y_Z)$ denotes the Z-specific probability of mortality or survivorship, and Z denotes a specific value of a specific variable $K_q$ that directly denotes a specific denoted phenomenon (e.g., age, lifespan, sex, lifespan aggregate size, contemporary aggregate size). An estimated model $n_{ij}=\beta_0+\beta_v X_{vij}+ \ldots +\beta_W X_{Wij}$ that includes and distinguishes at least one variable $X_{vij}$ that denotes lifespan differs from a corresponding model that does not include and distinguish—or otherwise excludes or omits—such variable. Similarly, individual probabilities $\pi(Y_{ij})$ or specific probabilities $\pi(Y_Z)$ that are based upon multivariable binary regression analyses that include and distinguish at least one variable $X_{vij}$ that denotes lifespan differ from corresponding probabilities that are not based upon such multivariable binary regression analyses. These differences apply to all multivariable binary regression models of mortality and survivorship, all kinds of individuals, and all kinds of denoted variables.

The evidence that is presented here and in Epelbaum (2014) is the first evidence for multivariable binary regression models of mortality and survivorship that include and distinguish at least one variable $X_{vij}$ that denotes lifespan. Similarly, the evidence that is presented here and in Epelbaum (2014) is the first evidence for individual probabilities that are based upon multivariable binary regression models of mortality and survivorship that include and distinguish at least one variable $X_{vij}$ that denotes lifespan.

Similarly, the evidence that is presented here and in Epelbaum (2014) is the first evidence for specific probabilities—i.e., phenomenon-specific-probabilities (e.g., lifespan-specific-probabilities, age-specific-probabilities, aggregate-size-specific- probabilities, historical-time-specific-probabilities) that are based upon multivariable binary regression models of mortality and survivorship that include and distinguish at least one variable $X_{vij}$ that denotes lifespan. Moreover, depictions and analyses of lifespan-specific probabilities of mortality and survivorship are not yet available; also not yet available are depictions and analyses of age-specific probabilities of mortality and survivorship that are distinct from lifespan-specific-probabilities and that are based upon multivariable binary regression models of mortality and survivorship that include and distinguish at least one variable $X_{vij}$ that denotes lifespan.

Absence, exclusion, or omission of independent variables that denote lifespan in multivariable binary regression analyses of mortality or survivorship could lead to omitted variables bias, unobserved heterogeneity bias, and errors of confusion (e.g., age is often erroneously confounded with lifespan; and population size or density are often erroneously confounded with corresponding distinct lifespan aggregates and contemporary aggregates). Absence, exclusion, or omission of independent variables that denote lifespan aggregates in multivariable binary regression analyses of mortality or survivorship could also be disadvantageous and lead to diverse biases. These considerations reveal that absence, exclusion, or omission of independent variables that distinguish and denote lifespan could be disadvantageous and could lead to diverse biases or errors. Inclusion of explicitly distinct independent variables that respectively denote explicitly distinct age, lifespan, lifespan aggregate, and contemporary aggregate variables could reduce or eliminate omitted variables bias, unobserved heterogeneity bias, or confusion errors in multivariable binary regression analyses of mortality or survivorship.

The foregoing considerations show diverse advantages of including explicitly distinct independent variables that respectively denote explicitly distinct age, lifespan, lifespan aggregate, and contemporary aggregate variables in multivariable binary regression models of mortality or survivorship. The foregoing considerations suggest that the shortcomings of the prior art could be overcome and additional advantages could be provided through the provision of methods, systems, and computer program products for including explicitly distinct independent variables that respectively denote explicitly distinct age, lifespan, lifespan aggregate, and contemporary aggregate variables in multivariable binary regression models of mortality or survivorship. Such methods, systems, and computer program products could be usefully utilized in diverse computing environments.

A computing environment provides an efficient and fast environment for processing regression analyses of diverse data, including very large data. In a computing environment, a plurality of local or remote devices are connected through at least one network. In this environment, regression analyses are conducted employing one or more processors of the computing environment to process the following: instructions for the regression analysis, specifications of models and procedures, and respective data, as illustrated in FIG. 1. Regression analyses and other statistical applications can be conducted in diverse kinds of computing environments. Diverse kinds of computing environments—including the cloud environment—for statistical applications are considered, for example, in U.S. Pat. No. 8,645,966 B2 (Andrade et al. 2014), U.S. Pat No. 9,152,921 B2 (Chu et al. 2015), and U.S. Pat. No. 9,443,194 B2 (Chu et al. 2016).

This invention claims methods, systems, and computer program products that are utilized in diverse computing environments for including and distinguishing independent variables that respectively denote distinct age, lifespan, lifespan aggregate, and contemporary aggregate variables in multivariable binary regression analyses of mortality or survivorship. Features, embodiments, and aspects of the invention are described in detail herein and are considered to be a part of the claimed invention.

SUMMARY

Methods, systems, and computer program products are hereby claimed for including and distinguishing independent variables that denote lifespan in multivariable binary regression analyses of mortality and survivorship. These methods, systems, and computer program products are demonstrated here by including and distinguishing lifespan in multivariable binary regression analyses of humans' and medflies' mortality and survivorship, revealing advantages for the description, specification, measurement, analysis, explanation, and prediction of mortality and survivorship.

BRIEF DESCRIPTION OF THE SEVERAL VIEWS OF THE DRAWINGS

One or more aspects of the present invention are particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts parts of setting and using a computing environment, in accordance with an aspect of the present invention.

FIG. 3 depicts variables, denotations, and selected data employed in multivariable analyses of humans' mortality and survivorship, in accordance with an aspect of the present invention.

FIG. 4 depicts part of a computer program for an individualized multivariable regression analysis of mortality of a sample of humans, in accordance with an aspect of the present invention.

FIG. 5 depicts results of a multivariable binary regression analysis of mortality of a sample of humans, in accordance with an aspect of the present invention.

FIG. 6 depicts individualized probabilities of humans' mortality, in accordance with an aspect of the present invention.

FIG. 7 depicts individualized lifespan-specific probabilities of mortality of selected humans at selected situations and at specific levels of lifespan, in accordance with an aspect of the present invention.

FIG. 8 depicts specifications of individualized lifespan-specific probabilities of mortality or survivorship and averaged lifespan-specific probabilities of mortality or survivorship of selected humans at selected situations at specific levels of lifespan, in accordance with an aspect of the present invention.

FIG. 10 depicts individualized age-specific probabilities of mortality of selected humans at selected situations and at specific levels of age, in accordance with an aspect of the present invention.

FIG. 11 depicts specifications of individualized age-specific probabilities of mortality or survivorship and averaged age-specific probabilities of mortality or survivorship of selected humans at selected situations at specific levels of age, in accordance with an aspect of the present invention.

FIG. 22 depicts a plot of two kinds of averaged age-specific probabilities of mortality and survivorship, wherein averages are calculated with respective medians, in accordance with an aspect of the present invention.

FIG. 23 depicts variables, denotations, and selected data employed in multivariable binary regression analyses of medflies' mortality and survivorship, in accordance with an aspect of the present invention.

FIG. 24 part of a computer program for an individualized multivariable regression analysis of survivorship of a sample of medflies, in accordance with an aspect of the present invention.

FIG. 25 depicts results of a multivariable binary regression analysis of survivorship of a sample of medflies, in accordance with an aspect of the present invention.

FIG. 26 depicts individualized probabilities of medflies' survivorship, in accordance with an aspect of the present invention.

FIG. 27 depicts individualized and averaged lifespan-specific probabilities of survivorship of selected medflies at selected situations and at specific levels of lifespan, in accordance with an aspect of the present invention.

DETAILED DESCRIPTION

Figure 1:
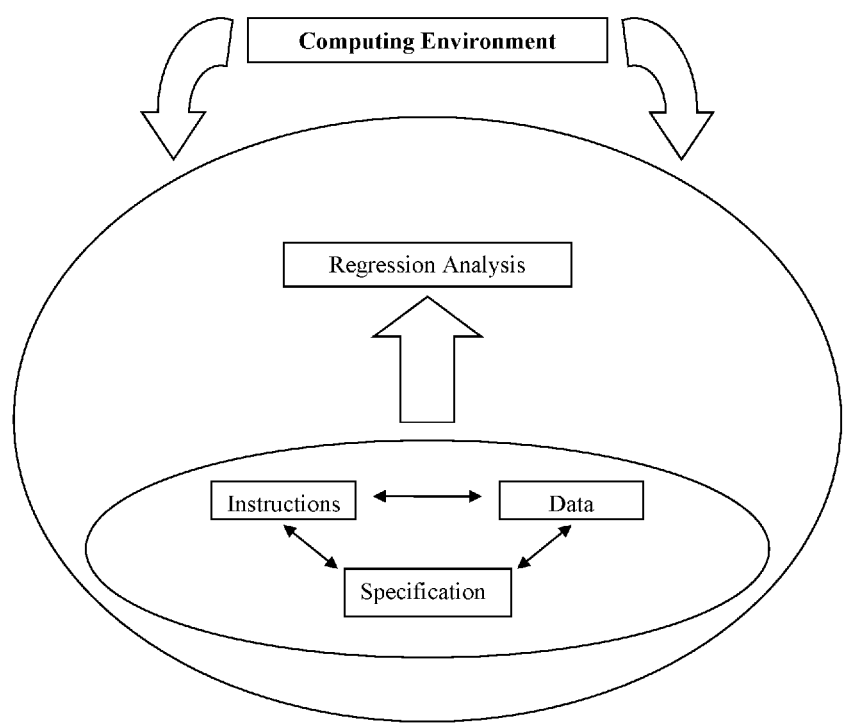
FIG. 1 depicts features of a computing environment of the regression analysis, in accordance with an aspect of the present invention.

Multivariable regression analyses of mortality or survivorship employ a computing environment that is schematically described in FIG. 1, in accordance with an aspect of the present invention. In the embodiments that are described herein, the computing environment includes computerized instructions and computer program products of the STATA° software from the Stata Corporation, College Station, Tex.; this software is processed by a computer system that is employed in the embodiments that are presented here. To process the regression analysis the computing environment requires computerized memory and processors, as illustrated in the example of FIG. 2, in accordance with an aspect of the present invention. The computing environment of the present embodiments also includes respective regression instructions. In the embodiments that are presented here, each model is specified mathematically by an operator who translates this mathematically specified model into a computer program that is written as STATA° instructions for the regression analysis. The computing environment also includes data for the regression analysis. The instructions, model, and data are then obtained by a processor of the computing environment; this processor performs the regression analysis by processing the instructions, model, and data, as illustrated in the example of FIG. 1, in accordance with an aspect of the present invention. It is, however, important to note that there are diverse kinds of computing environments for regression analyses as considered, for example, in U.S. Pat. No. 8,645,966 B2 (Andrade et al. 2014). Diverse kinds of computing environments can incorporate and use one or more aspects of the present invention. Moreover, there are diverse kinds of multivariable binary regression models and binary link functions, as considered, for example, in U.S. Pat. No. 8,417,541 B1 (Kramer 2013), Epelbaum (2014), Hilbe (2009), Gündüz and Fokoué (2015), and Royston and Sauerbrei (2008). These diverse kinds of computing environments and multivariable binary regression analysis can incorporate and use one or more aspects of the present invention.

The following paragraphs present embodiments of the invention; these embodiments include and distinguish age, lifespan, lifespan aggregate, and contemporary aggregate in multivariable binary regression analyses of humans' mortality and survivorship.

In embodiments of the invention that are presented here, the data on mortality or survivorship of samples of humans are compiled from the deaths 1×1 and exposures 1×1 tables (last modified on 14 Jul. 2010) from the Human Mortality Database, known as HIVID. The HIVID data are stored in the memory of a computer at the Max Planck Institute for Demographic Research in Germany, and—in the present embodiments of the invention—they are transmitted through the internet to the memory of a computer in the USA. In the present embodiments, a processor of a computer in the USA processes these HIVID data and compiles them into pluralized data on age-sex-year-specific deaths and age-sex-year-specific exposures of males and females in ages 0 to 110+ in Sweden 1751-2008. The processor further processes these pluralized data and converts them to individualized data focusing on yearly events of each individual's death or survival, where each individualized case is weighted by its corresponding number of age-lifespan-sex-specific identical individuals (i.e., the number of sex-specific individuals who are born in the year of birth of the criterion individual and who die in the year of death of the criterion individual). Computer intensive analyses impose restrictions on the size of the data file for the present analyses. Therefore, the analytic individualized data file is restricted here to 188,087 weighted cases with 79,164,608 events of deaths or survivals of all individuals born in Sweden in decennial years 1760-1930, with deaths occurring between 1760 and 2008.

As depicted in FIG. 3, each row depicts one data record containing data on the following: one individual in a specific situation (i denotes the individual and j denotes the situation, the situation refers here to the events occurring during a specific year in the life of the respective individual human), this individual's death or survival (depicted in columns $M_{ij}$ and $S_{ij}$, respectively denoting mortality or survivorship of individual i at situation j in FIG. 3), this individual's sex (depicted in column $G_{ij}$, wherein $G_{ij}=1$ denotes being female, and $G_{ij}=0$ denotes being male in FIG. 3), this individual's age during this situation (during the mid-year, depicted in column $A_{ij}$ in FIG. 3), this individual's lifespan (depicted in column $L_{ij}$ in FIG. 3), this individual's historic context (depicted in column $H_{ij}$, denoting a specific year, starting at year 1760 which is coded as year 0.5 in FIG. 3), the individual's lifespan aggregate size (i.e., number of corresponding age-lifespan-year-sex-specific-identical individuals, this is the number of age-sex-specific individuals with identical birth year and identical death year to the criterion individual, as depicted in column $\Lambda_{ij}$ in FIG. 3), the individuals' contemporary aggregate size (i.e., the number of age-year-sex-specific individuals that are exposed to the risk of death and prospect of survival during this situation, i.e., during the specific year, as depicted in column $C_{ij}$ in FIG. 3). The resultant data file contains 188,087 weighted cases corresponding to 79,164,608 events of deaths or survivals of all individuals born in Sweden in decennial years 1760-1930, wherein the individual's lifespan aggregate size (i.e., as depicted in column $\Lambda_{ij}$ in FIG. 3) is the weighting variable in the analyses, and wherein J (i.e., the total number of situations j of each specific individual) varies among individuals.

Based upon previous research, theoretical knowledge, and the available data, the analyst selected the following denoted variables: Age, lifespan, lifespan aggregate size, contemporary aggregate size, historical time, and sex. These denoted variables are respectively denoted here with $A_{ij}$, $L_{ij}$, $C_{ij}$, $\Lambda_{ij}$, $H_{ij}$, and $G_{ij}$ for an individual i at situation j; in these denotations A denotes age (in years), L denotes lifespan (in years), C denotes contemporary aggregate size, $\Lambda$ (the Greek capital letter Lambda) denotes lifespan aggregate size, H denotes historical time, and G denotes sex. Numerical values for these denoted variables for individuals i at situations j are illustrated here in FIG. 3. Transformations of these denoted variables are included as independent variables $X_{vij}$ in multivariable binary regression model $n_{ij}=\beta_0+\beta_v X_{vij}+ \ldots +\beta_W X_{Wij}$ for one of $Y_{ij}=M_{ij}$ and $Y_{ij}=S_{ij}$ of humans in Sweden 1760-2008.

The analysis in the present embodiment employs forward selection methods in iterative multivariable binary regression analyses of humans' mortality or survivorship to select transformations of each of denoted variables $A_{ij}$, $L_{ij}$, $C_{ij}$, $\Lambda_{ij}$, $H_{ij}$, and $G_{ij}$ for an individual i at situation j. In these iterative analyses, the analyst tested power transformations of each of these denoted variables, selecting transformation that improved AIC and BIC. In these analyses, analyst conducted iterative multivariable binary regression analyses of humans' mortality or survivorship. The initial iterating multivariable binary regression analyses utilized diverse input models $n_{ij}\beta_0+B_1 X_{1ij}+\beta_2 X_{2ij}$ with respective logit, probit, and complementary log-log binary link functions—as well as $X_1=G_{ij}$ and diverse values of power coefficient p in $X_2=(A_{ij})^p$ wherein $G_{ij}$ denotes sex and $A_{ij}$ denotes age—for one of $Y_{ij}=M_{ij}$ and $Y_{ij}=S_{ij}$; these iterative analyses sought to optimize AIC and BIC values, selecting the power coefficient p beyond which AIC and BIC cease to improve, ensuring that all regression coefficients in the selected model are significant beyond the 0.001 level. Utilizing said selected power coefficient p in $X_{2ij}=(A_{ij})^p$, the analyst proceeded to conduct further iterative multivariable binary regression analyses with input model $n_{ij}=\beta_0+\beta_1 X_{1ij}+\beta_2 X_{2ij}+\beta_3 X_{3ij}$ and logit, probit, and complementary log-log binary link functions for one of $Y_{ij}=M_{ij}$ and $Y_{ij}=S_{ij}$ to find optimal AIC and BIC values for diverse values of power coefficient p in $X_{3ij}=(L_{ij})^p$. Utilizing these forward selection methods per additional respective denoted variable, the analyst continued to select optimal power coefficients p in such iterative transformations of respective denoted variables in $X_{4ij}=(C_{ij})^p$, $X_{5ij}=(\Lambda_{ij})^p$, and $X_{6ij}=(H_{ij})^p$ in respective input models until reaching an optimal best-fitting first-degree polynomial input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}$. Utilizing said respective selected optimal first-degree polynomial power coefficients p, the analyst continued to test the optimality of second degree polynomial transformations for these respective selected power coefficients p, optimizing AIC and BIC criteria in such iterative transformations of respective denoted variables in $X_{7ij}=\{(A_{ij})^p\}^2$, $X_{8ij}=\{(L_{ij})^p\}^2$, $X_{9ij}=\{(C_{ij})^p\}^2$, $X_{10ij}=\{(\Lambda_{ij})^p\}^2$, and $X_{11ij}=\{(H_{ij})^p\}^2$ in respective input models; reaching an optimal second-degree powered polynomial input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}+\beta_{11} X_{11ij}$. Utilizing said respective selected optimal first-degree and second-degree polynomials power coefficients p, the analyst continued to test the optimality of third-degree polynomial transformations for these respective selected power coefficients p, finding that respective $X_{12ij}=\{(A_{ij})^p\}^3$, $X_{12ij}=\{(L_{ij})^p\}^3$, $X_{12ij}=\{(C_{ij})^p\}^3$, and $X_{12ij}=\{(\Lambda_{ij})^p\}^3$ failed to improve AIC and BIC criteria in such iterative transformations, but finding that $X_{12ij}=\{(H_{ij})^p\}^3$ did improve AIC and BIC criteria in such iterative transformations, thus reaching a best-fitting input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}+\beta_{11} X_{11ij}+\beta_{12} X_{12ij}$ and a logit binary link function that incorporate an identity transformation of denoted binary variable $G_{ij}$ as well as first-degree and second-degree polynomial transformations of denoted powered variables $A_{ij}$, $L_{ij}$, $C_{ij}$, $\Lambda_{ij}$, $H_{ij}$, and third-degree polynomial transformation of denoted powered variable $H_{ij}$. Computer instructions for said input model of humans' mortality are depicted in FIG. 4. In all these iterative analyses, the analyst used non-negative values of power coefficient p (in the interest of investigating power laws), utilizing the natural logarithmic transformation when $p=0$ (e.g., using $X_1=\ln(A_{ij})$ instead of $X_1=(A_{ij})^0$), and allowing identity transformation (i.e., when $p=1$, e.g., using $X_1=(A_{ij})^1=A_{ij}$), ensuring that all regression coefficients in respective selected best-fitting models are significant beyond the 0.0001 level of significance. Moreover, all analyses employed random effects input models. Further information on these analyses is available in Epelbaum (2014).

In the best-fitting multivariable binary regression analysis of human's mortality, the analyst created a data set consisting of one variable $Y_{ij}$ and 12 variables $X_{vij}$ for 188,087 data records, wherein each record is weighted for depicting 79,164,608 situations j involving all individuals that were born in Sweden in decennial years 1760-1930 and died between 1760 and 2008. Each data record contains yearly data on a respective individual i in a respective situation j, said data consisting of $Y_{ij}=M_{ij}$, $X_{1ij}=G_{ij}$, $X_{2ij}=(A_{ij})^{0.16}$, $X_{3ij}=(L_{ij})^{0.88}$, $X_{4ij}=(C_{ij})^{0.75}$, $X_{5ij}=(\Lambda_{ij})^{0.30}$, $X_{6ij}=(H_{ij})^{1.41}$, $X_{7ij}=\{(A_{ij})^{0.16}\}^2$, $X_{8ij}=\{(L_{ij})^{0.88}\}^2$, $X_{9ij}=\{(C_{ij})^{0.75}\}^2$, $X_{10ij}=\{(\Lambda_{ij})^{0.30}\}^2$, $X_{11ij}=\{(H_{ij})^{1.41}\}^2$, and $X_{12ij}=\{(H_{ij})^{1.41}\}^3$, wherein, as noted and as illustrated in FIG. 3, i denotes an individual, j is a consecutive number of the year of life of this individual, $M_{ij}=1$ when the individual is dead, and $M_{ij}=0$ when the individual is not dead, $A_{ij}$ denotes the individual's age (in years) at situation j, $L_{ij}$ denotes the individual's lifespan (in years) at situation j, $C_{ij}$ denotes the individual's contemporary aggregate size at situation j, $\Lambda_{ij}$ denotes the individual's lifespan aggregate size at situation j, $H_{ij}$ denotes the individual's historical time at situation j (where H denotes a calendar year transformed to a sequential number), $G_{ij}=1$ when the individual is female, and $G_{ij}=0$ when the individual is male. In said best-fitting multivariable binary regression analysis of humans' mortality the analyst employed an input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}+\beta_{11} X_{11ij}+\beta_{12} X_{12ij}$ with a logit binary link function $B(n_{ij})=\ln\{n_{ij}/(1-n_{ij})\}$. Computer instructions for said input model and said logit binary link function are shown in FIG. 4. A computer output for this estimated model is depicted in FIG. 5. Utilizing corresponding best-fitting estimated regression coefficients that are depicted in FIG. 5, and utilizing respective denoting variables that correspond to variables $X_{vij}$, the best-fitting estimated model is specified with $n_{ij}=511.78-1074.55(A_{ij}^{0.16})+546.12(A_{ij}^{0.16})^2-17.12(L_{ij}^{0.88})+0.101(L_{ij}^{0.88})^2+0.006(C_{ij}^{0.75})-(4.39e-7)(C_{ij}^{0.75})^2+6.19(\Lambda_{ij}^{0.30})-0.35(\Lambda_{ij}^{0.30})^2-0.008(H_{ij}^{1.41})+(1.92e-6)(H_{ij}^{1.41})^2-(7.97e-10)(H_{ij}^{1.41})^3-1.13(G_{ij})$ with a logit binary link function $B(n_{ij})=\ln\{n_{ij}/(1-n_{ij})\}$.

As noted, an individualized probability of mortality refers to the probability of an individual's mortality; $\pi(M_{ij})$ denotes here the probability of mortality of individual i at situation j, $\pi(M_{ij})$ is calculated here with $\pi(M_{ij})=F(n_{ij})$. Utilizing said best-fitting estimated model of humans' mortality in Sweden 1760-2008, the individualized probability of mortality $\pi(M_{ij})$ is calculated with $\pi(M_{ij})=F(n_{ij})=1/\{1+\exp(-n_{ij})\}=\{\exp(n_{ij})\}/\{1+\exp(n_{ij})\}$ wherein cumulative distribution function $F(n_{ij})$ corresponds to said best-fitting logit binary link function $B(n_{ij})=\ln\{n_{ij}/(1-n_{ij})\}$. Utilizing said model and said cumulative distribution function $F(n_{ij})$, FIG. 6 shows selected $n_{ij}$ values and selected $\pi(M_{ij})$ values that correspond to the data that are shown in FIG. 3, these values also correspond to the computer program that is shown in FIG. 4, these values further correspond to the results that are shown in FIG. 5.

As noted, examples of a phenomenon-specific probability of mortality include an age-specific probability of mortality, a size-specific probability of mortality, and a sex-specific probability of mortality. As noted, an individualized Z*-specific probability of mortality of individual i at situation j is denoted here by $\pi(M_{ijZ*})$, wherein Z denotes a specific phenomenon, and Z* denotes a specific selected value of this specific phenomenon. As further noted, $\pi(M_{ijZ*})$ is estimated here by utilizing $n_{ijZ*}=\beta_0+\Sigma\beta_v Z^* +\Sigma\beta_v X_{vij-Z}$ and $\pi(M_{ijZ*})=F(H_{ijZ*})$. Therefore, utilizing L=Z wherein L denotes lifespan, $\pi(M_{ijL*})$ denotes an individualized lifespan-specific probability of mortality of individual i at situation j and at a specific level L*, wherein L* denotes a specific level of lifespan L. Therefore, based upon said best-fitting model of humans' mortality in Sweden 1760-2008, $n_{ijL*}=511.78-1074.55(A_{ij}^{0.16})+546.12(A_{ij}^{0.16})^2-17.12(L^{*0.88})+0.101(L^{*0.88})^2+0.006(C_{ij}^{0.75})-(4.39e-7)(C_{ij}^{0.75})^2+6.19(\Lambda_{ij}^{0.30})-0.35(\Lambda_{ij}^{0.30})^2-0.008(H_{ij}^{1.41})+(1.92e-6)(H_{ij}^{1.41})^2-(7.97e-10)(H_{ij}^{1.41})^3-1.13(G_{ij})$, wherein all the independent variables—except variable L—apply to individual i at situation j. In said model for $n_{ijL*}$, L denotes a specifically selected level of variable L, but L* applies to all individuals i at respective situations j. Said best-fitting model for $n_{ij}$ has been estimated utilizing a logit binary link function; therefore, $\pi(M_{ijL*})=F(n_{ijL*})=1/\{1+\exp(-n_{ijL*})\}=\{\exp(n_{ijL*})\}/\{1+\exp(n_{ijL*})\}$ for individual i at situation j and at a specific lifespan level L*. Utilizing said best-fitting model for $n_{ijL*}$ and said $\pi(M_{ijL*})=F(n_{ijL*})$, and utilizing the data from FIG. 6, FIG. 7 presents values of individualized lifespan-specific probabilities of mortality $\pi(M_{ijZ*})$ of selected individuals i at selected situations/ and at the following specific levels of lifespan: L*=0.5 year (denoting less than 1 year), L*=40 years, L*=60 years, and L*=90 years.

FIG. 7 illustrates that if the lifespan is set at 0.5 year (denoting less than 1 year) then individualized lifespan-specific probability of mortality $\pi(M_{ijL*})$ is estimated to be 1 for each of the about 6,519 males whose age was less than 1 year and whose contemporary aggregate size was about 27,866 in 1760; FIG. 7 illustrates that if the lifespan is set at 40, 60, or 90 years then individualized lifespan-specific probability of mortality $\pi(M_{ijL*})$ is estimated to be 0 for each of the about 6,519 males whose age was less than 1 year and whose contemporary aggregate size was about 27,866 in 1760; FIG. 7 illustrates that if the lifespan is set at less than 1 year then individualized lifespan-specific probability of mortality $\pi(M_{ijL*})$ is estimated to be 1 for each of the about 52 females whose age was 93 years and whose contemporary aggregate size is about 151 in 1760; FIG. 7 illustrates that if the lifespan is set at 40, 60, or 90 years then individualized lifespan-specific probability of mortality $\pi(M_{ijL*})$ is estimated to be 1 for each of the about 52 females whose age was 93 years and whose contemporary aggregate size was about 151 in 1760; FIG. 7 illustrates that if the lifespan is set at less than 1 year then individualized lifespan-specific probability of mortality $\pi(M_{ijL*})$ is estimated to be 1 for each of the about 576 females whose age was less than 1 year and whose contemporary aggregate size was about 60,364 in 1890; FIG. 7 also illustrates that if the lifespan is set at 40, 60, or 90 years then individualized lifespan-specific probability of mortality $\pi(M_{ijL*})$ is estimated to be 0 for each of the about 576 females whose age was less than 1 year and whose contemporary aggregate size was about 60,364 in 1890.

As noted, a plot of $\pi(M_{ijZ})$ is a plot of at least two individualized specific probabilities of mortality $\pi(M_{ijZ*})$, wherein $\pi(M_{ijZ})$ denotes at least two probabilities $\pi(M_{ijZ*})$ (wherein said at least two probabilities $\pi(M_{ijZ*})$ denote respective individualized specific probabilities of mortality of individual i at situation j and at at least two specifically selected Z* values of variable Z). Based upon said best-fitting model of humans' mortality in Sweden 1760-2008, FIG. 7 specifies $\pi(M_{ijL*})$ values of individual i =1 at situation j=1 in FIG. 6 and FIG. 7; this individual was a less than 1 year old Swedish male who died in 1760; FIG. 6 and FIG. 7 indicate that there were an estimated 6,519 Swedish males who were less than 1 year old and that also died that year in Sweden, further indicating that these males are included in the estimated 27,866 Swedish males who were less than 1 year old at that year.

Figure 9:
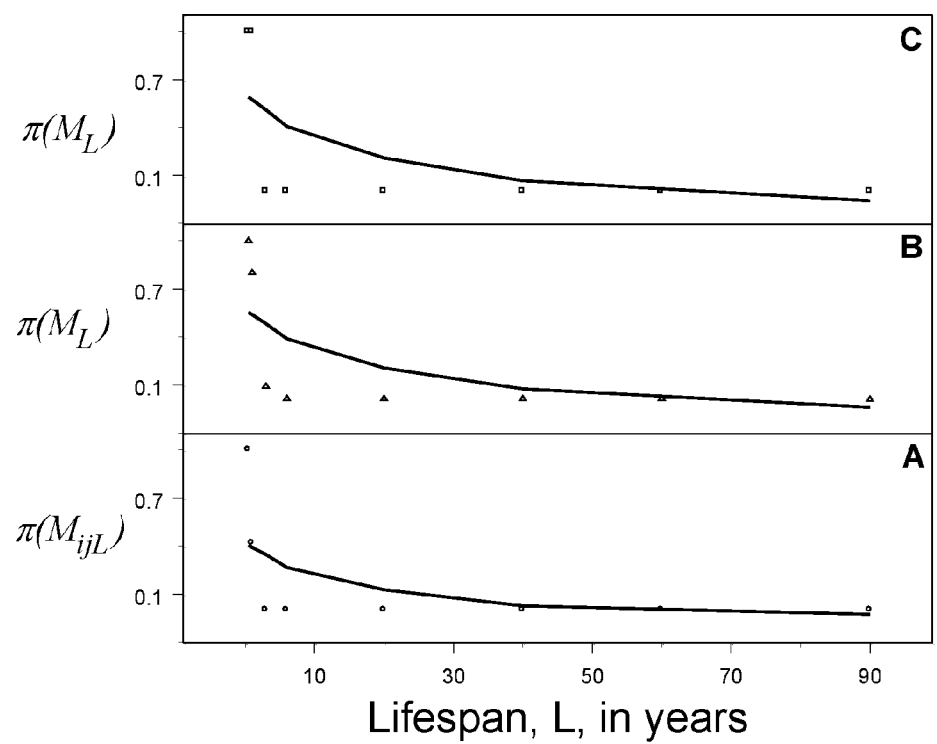
FIG. 9 depicts a plot of individualized lifespan-specific probabilities of mortality by lifespan and a plot of averaged lifespan-specific probabilities of mortality by lifespan, in accordance with an aspect of the present invention.

The $\pi(M_{ijL*})$ data about individual i=1 at situation j=1 and at lifespans 0.5, 40, 60, and 90 in FIG. 7 is specified in greater detail in FIG. 8. FIG. 8 also adds $\pi(M_{ijL*})$ data at lifespans 1, 3, and 6 of this individual. Based upon the $\pi(M_{ijL*})$ data about individual i=1 at situation j=1 in FIG. 8, panel A of FIG. 9 shows a scatterplot and a corresponding supersmoothed Friedman line of $\pi(M_{ijL})$ by lifespan L, depicting the trajectory of the individualized lifespan-specific probabilities of mortality $\pi(M_{ijL})$ of the less than 1 year old male who died in Sweden in 1760, wherein $\pi(M_{ijL})$ denotes individualized lifespan-specific probabilities of mortality.

As noted, an averaged Z*-specific probability of mortality of individuals i at respective situations j is denoted here by $\pi(M_{Z*})$, wherein Z denotes a specific phenomenon, Z* denotes a specific level of this specific phenomenon, and "average" refers to one of the statistical measures of location or central tendency (e.g., mean, median, mode). As also noted, estimation of $\pi(Y_{Z*})$ of one of $\pi(M_{Z*})=\pi(Y_{Z*})$ and $\pi(S_{Z^*})=\pi(Y_{Z^*})$ utilizes $n_{ijZ^*}=\beta_0+\Sigma\beta_v Z^*+\Sigma\beta_v X_{vij-Z}$ and at least one of $\pi(Y_{Z^*})=F\{average(n_{ijZ^*})\}$ and $\pi(Y_{Z^*})=average\{F(n_{ijZ^*})\}$. FIG. 8 illustrates $\pi(Y_{L^*})$ of each of $\pi(M_{L^*})=\pi(Y_{L^*})$ and $\pi(S_{L^*})$ at selected specific levels of lifespan L*; these $\pi(Y_{L^*})$ were calculated utilizing arithmetic means of the 19,394 events of death or survival in Sweden 1760-2008 that are shown in FIG. 7.

As noted, a plot of $\pi(M_Z)$ is a plot of at least two averaged specific probabilities of mortality $\pi(M_{Z^*})$, wherein $\pi(M_Z)$ denotes at least two probabilities $\pi(M_{Z^*})$ (wherein said at least two probabilities $\pi(M_{Z^*})$ denote respective averaged specific probabilities of mortality at at least two specifically selected Z* values of variable Z). Utilizing the respective $\pi(M_{L^*})=average\{F(n_{ijL^*})\}$ data in FIG. 8, panel B of FIG. 9 illustrates a scatterplot and a supersmoothed Friedman lineplot of averaged lifespan-specific probabilities of mortality that are denoted by $\pi(M_L)$, wherein $\pi(M_L)$ denotes more than one selected averaged lifespan-specific probabilities of mortality $\pi(M_{L^*})$. Similarly, utilizing the respective $\pi(M_{L^*})=F\{average(n_{ijL^*})\}$ data in FIG. 8, panel C of FIG. 9 illustrates a scatterplot and a supersmoothed Friedman lineplot of averaged lifespan- specific probabilities of mortality that are denoted by $\pi(M_L)$, wherein $\pi(M_L)$ denotes more than one selected averaged lifespan-specific probabilities of mortality $\pi(M_{L^*})$.

Individualized age-specific probability of mortality of individual i at situation j and at a specific level of age is estimated here utilizing $n_{ijA^*}\beta_0+\Sigma\beta_v A^*+\Sigma\beta_v X_{vij-A}$, wherein A denotes age and wherein A* denotes the specific level of age, and further utilizing $\pi(M_{ijA^*})=F(H_{ijA^*})$, wherein $\pi(M_{ijA^*})$ denotes the individualized age-specific probability of mortality of an individual i at a respective situation j at said specific level of age A*. Utilizing the best-fitting model of humans' mortality in Sweden 1760-2008, $n_{ijA^*}=511.78-1074.55(A^{*0.16})+546.12(A^{*0.16})^2-17.12(L_{ij}^{0.88})+0.101(L_{ij}^{0.88})^2+0.006(C_{ij}^{0.75})-(4.39e-7)(C_{ij}^{0.75})^2+6.19(\Lambda_{ij}^{0.30})-0.35(\Lambda_{ij}^{0.30})^2-0.008(H_{ij}^{1.41})+(1.92e-6)(H_{ij}^{1.41})^2-(7.97e-10)(H_{ij}^{1.41})^3-1.13(G_{ij})$ and $\pi(M_{ijA^*})=F(n_{ijA^*})=1/\{1+exp(-n_{ijA^*})\}=\{exp(n_{ijA^*})\}/\{1+exp(n_{ijA})\}$ for individual i at situation j and at a specific age A*, FIG. 10 presents values of individualized age-specific probabilities of mortality $\pi(M_{ijA^*})$ of selected individuals i at selected situations j and at the following specific levels of age: A*=0.5 year (denoting less than 1 year), A*=40 years, A*=60 years, and A*=90 years.

FIG. 10 illustrates that if age is set at 0.5 year (denoting less than 1 year) or 40, 60, or 90 years then individualized age-specific probability of mortality $\pi(M_{ijA^*})$ is estimated to be 1 for each of the about 6,519 males whose lifespan was less than 1 year and whose contemporary aggregate size was about 27,866 in 1760; FIG. 10 illustrates that if age is set at less than 1 year or 40, 60, or 90 years then individualized age-specific probability of mortality $\pi(M_{ijA^*})$ is estimated to be 0 for each of the about 52 females whose lifespan was 93.5 years and whose contemporary aggregate size is about 151 in 1760; FIG. 10 illustrates that if age is set at less than 1 year then individualized age-specific probability of mortality $\pi(M_{ijA^*})$ is estimated to be 0 for each of the about 576 females whose lifespan was 93.5 years and whose contemporary aggregate size was about 60,364 in 1890; FIG. 10 also illustrates that if age is set at 40, 60, or 90 years then individualized age-specific probability of mortality $\pi(M_{ijA^*})$ is estimated to be 1 for each of the about 576 females whose lifespan was 93.5 years and whose contemporary aggregate size was about 60,364 in 1890.

The $\pi(M_{ijA})$ data about individual i=1 at situation j=1 and at ages 0.5, 40, 60, and 90 in FIG. 10 is specified in greater detail in FIG. 11. FIG. 11 also adds $\pi(M_{ijA^*})$ data at ages 1, 3, and 6 of this individual. Based upon the $\pi(M_{ijA^*})$ data about individual i=1 at situation j=1 in FIG. 11, panel A in FIG. 12 shows a scatterplot and a corresponding supersmoothed Friedman line of $\pi(M_{ijA})$ by age A, depicting the trajectory of the individualized age-specific probabilities of mortality $\pi(M_{ijA})$ of the less than 1 year old male who died in Sweden in 1760, wherein $\pi(M_{ijA})$ denotes individualized age-specific probabilities of mortality.

FIG. 11 illustrates $\pi(Y_{A^*})$ of each of $\pi(M_{A^*})=\pi(Y_{A^*})$ and $\pi(S_{A^*})=\pi(Y_{A^*})$ at selected specific levels of age A*; these $\pi(Y_{A^*})$ were calculated utilizing arithmetic means of the 19,394 events of death or survival in Sweden 1760-2008 that are shown in FIG. 10.

Figure 12:
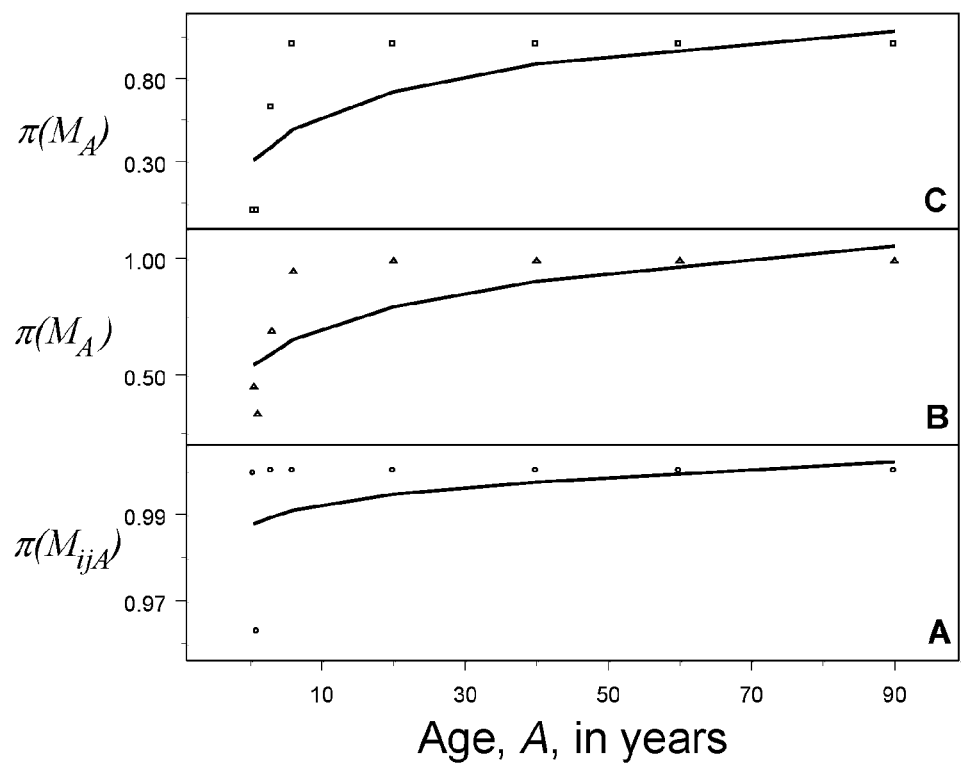
FIG. 12 depicts a plot of individualized age-specific probabilities of mortality by age and a plot of averaged age-specific probabilities of mortality by age, in accordance with an aspect of the present invention.

Utilizing the respective $\pi(M_{A^*})=average\{F(n_{ijA^*})\}$ data in FIG. 11, panel B in FIG. 12 illustrates a scatterplot and a supersmoothed Friedman lineplot of averaged age-specific probabilities of mortality that are denoted by $\pi(M_A)$, wherein $\pi(M_A)$ denotes more than one especially selected averaged age-specific probabilities of mortality $\pi(M_{A^*})$. Similarly, utilizing the respective $\pi(M_{A^*})=F\{average(n_{ijA^*})\}$ data in FIG. 11, panel C in FIG. 12 illustrates a scatterplot and a supersmoothed Friedman lineplot of averaged age-specific probabilities of mortality that are denoted by $\pi(M_A)$, wherein $\pi(M_A)$ denotes more than one especially selected averaged age-specific probabilities of mortality $\pi(M_{A^*})$.

The invention is also applied here in multivariable binary regression analysis of humans' survivorship. In the best-fitting multivariable binary regression analysis of human's survivorship, the analyst created a data set consisting of the same data and denotations as the corresponding mortality data set except for using $Y_{ij}=S_{ij}$ instead of $Y_{ij}=M_{ij}$, so that $S_{ij}=1$ when the individual is alive, and $S_{ij}=0$ when the individual is not alive. In said best-fitting multivariable binary regression analysis of humans' survivorship the analyst also employed an input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10}X_{10ij}+\beta_{11}X_{11ij}+\beta_{12}X_{12ij}$ with a logit binary link function $B(n_{ij})=\ln\{n_{ij}/(1-n_{ij})\}$. The best-fitting multivariable binary regression analyses of humans' survivorship also yielded a best-fitting estimated model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10}X_{10ij}+\beta_{11}X_{11ij}+\beta_{12}X_{12ij}$ with an $F(n_{ij})=1/\{1+exp(-n_{ij})\}=\{exp(n_{ij})\}/\{1+exp(n_{ij})\}$ cumulative distribution function corresponding to said logit binary link function $B(n_{ij})=\ln\{n_{ij}/(1-n_{ij})\}$. Utilizing corresponding best fitting estimated regression coefficients, and utilizing respective denoting variables that correspond to variables $X_{vij}$, the best-fitting estimated model for humans' survivorship is specified with $n_{ij}=-511.78+1074.55(A_{ij}^{0.16})-546.12(A_{ij}^{0.16})^2+17.12(L_{ij}^{0.88})-0.101(L_{ij}^{0.88})^2-0.006(C_{ij}^{0.75})+(4.39e-7)(C_{ij}^{0.75})^2-6.19(\Lambda_{ij}^{0.30})+0.35(\Lambda_{ij}^{0.30})^2+0.008(H_{ij}^{1.41})-(1.92e-6)(H_{ij}^{1.41})^2+(7.97e-10)(H_{ij}^{1.41})+1.13(G_{ij})$ for which the probability of survivorship $\pi(S_{ij})$ is calculated with $\pi(S_{ij})=F(n_{ij})=1/\{1+exp(-n_{ij})\}=\{exp(n_{ij})\}/\{1+exp(n_{ij})\}$ corresponding to said logit binary link function $B(n_{ij})=\ln\{n_{ij}/(1-n_{ij})\}$.

Figure 13:
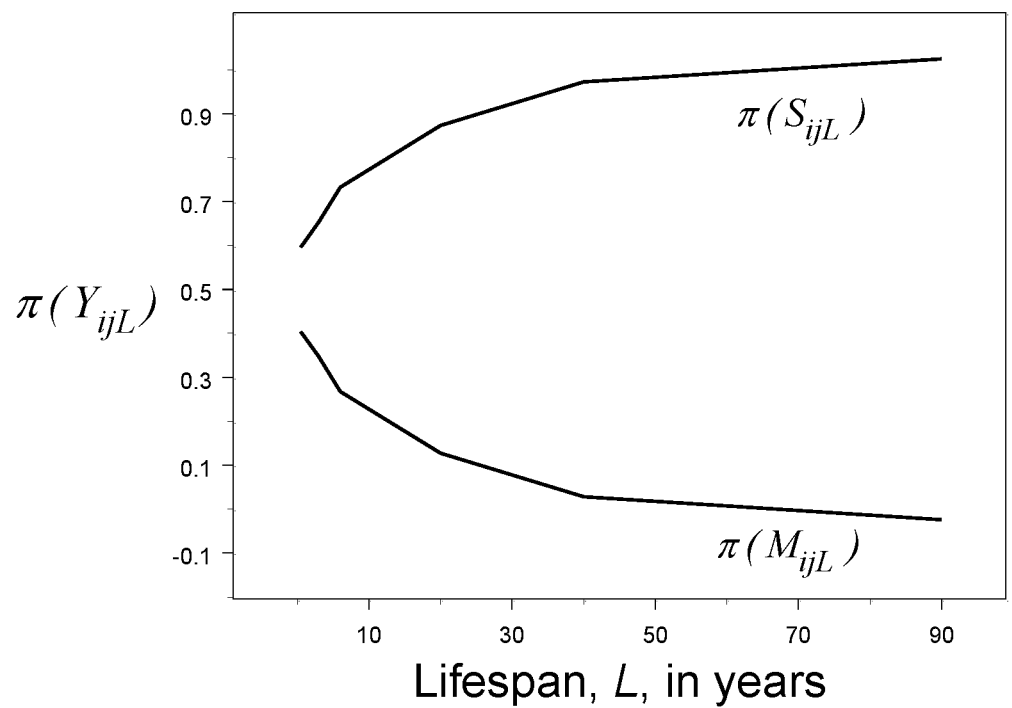
FIG. 13 depicts a plot of individualized lifespan-specific probabilities of mortality and survivorship by lifespan, in accordance with an aspect of the present invention.
Figure 14:
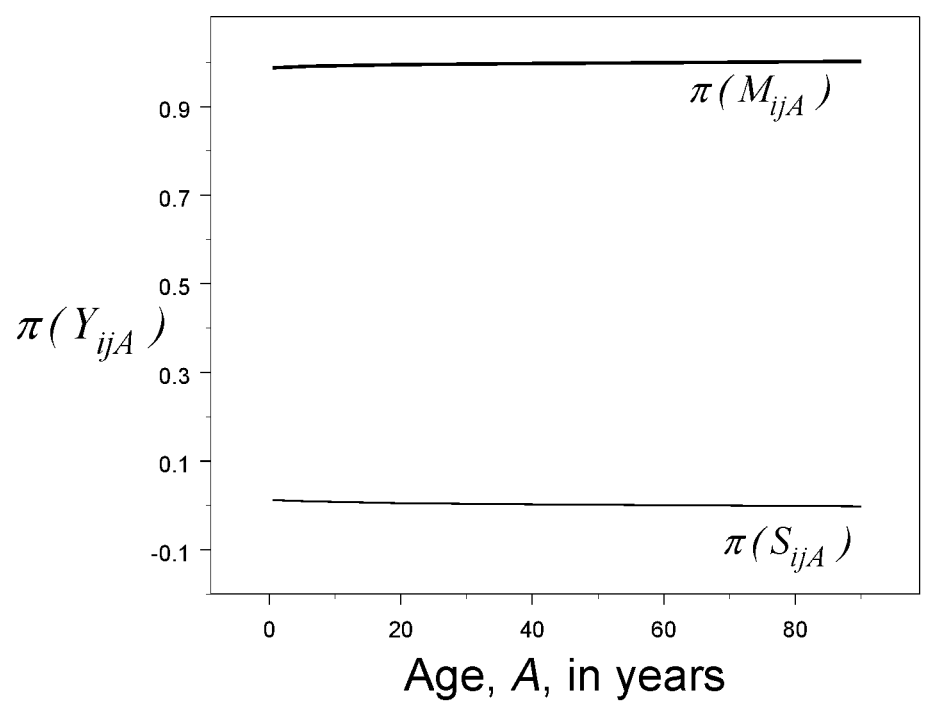
FIG. 14 depicts a plot of individualized age-specific probabilities of mortality and survivorship by age, in accordance with an aspect of the present invention.

As noted, $\pi(MS_{ijZ})$ denotes the combination of corresponding $\pi(M_{ijZ})$ and $\pi(S_{ijZ})$ at at least two specifically selected Z* values of variable Z. Utilizing respective supersmoothed Friedman lineplots for respective $\pi(M_{ijL^*})$ and $\pi(S_{ijL^*})$ data from FIG. 8, FIG. 13 shows $\pi(MS_{ijL})$ plots of the combination of corresponding $\pi(M_{ijL})$ and $\pi(S_{ijL})$ trajectories. Utilizing respective supersmoothed Friedman lineplots for respective $\pi(M_{ijA^*})$ and $\pi(S_{ijA^*})$ data from FIG. 11, FIG. 14 shows $\pi(MS_{ijA})$ plots of the combination of corresponding $\pi(M_{ijA})$ and $\pi(S_{ijA})$ trajectories.

Figure 15:
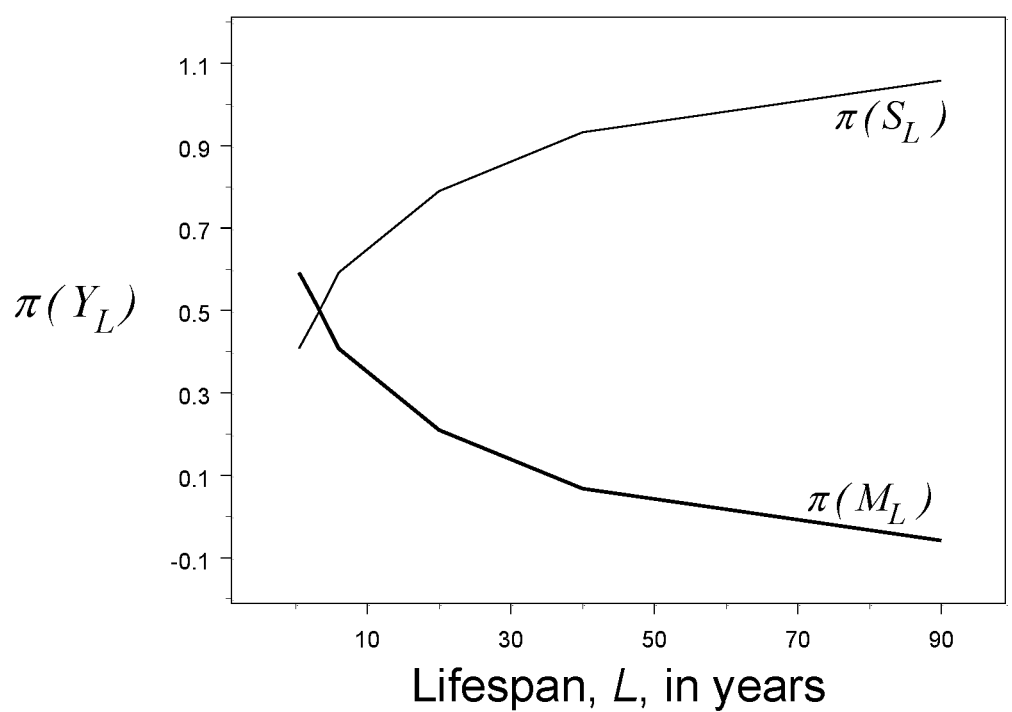
FIG. 15 depicts a plot of one kind of averaged lifespan-specific probabilities of mortality and survivorship by lifespan, in accordance with an aspect of the present invention.
Figure 16:
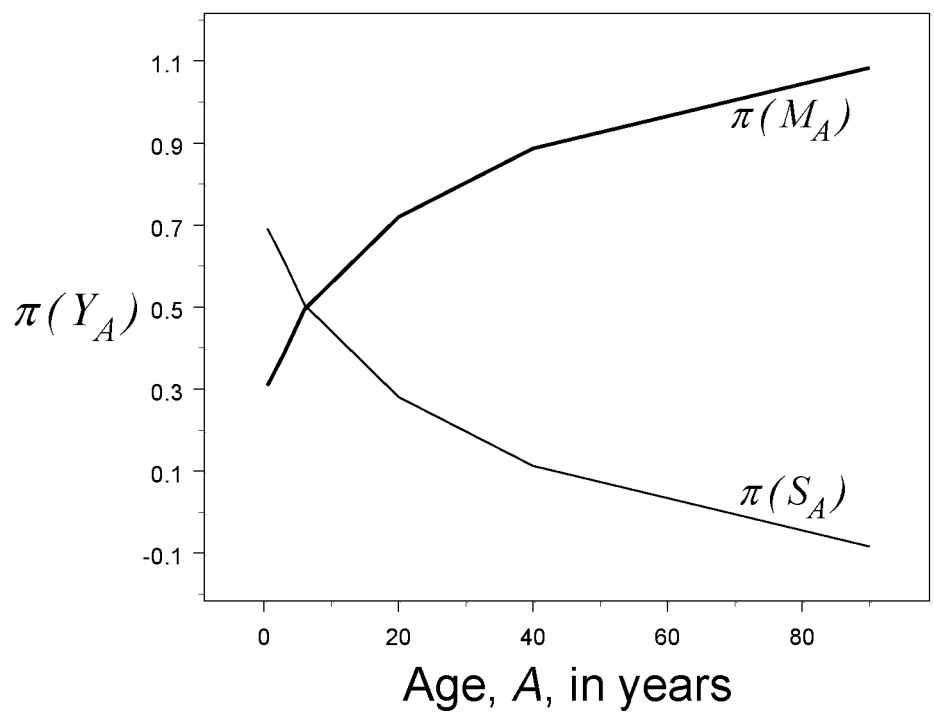
FIG. 16 depicts a plot of one kind of averaged age-specific probabilities of mortality and survivorship by age, in accordance with an aspect of the present invention.

As noted, $\pi(MS_Z)$ denotes the combination of corresponding $\pi(M_Z)$ and $\pi(S_Z)$ at at least two specifically selected Z* values of variable Z. Utilizing respective supersmoothed Friedman lineplots for respective $\pi(M_{L*})$=F{average($n_{ijL*}$)} and $\pi(S_{L*})$=F{average($n_{ijL*}$)} data from FIG. 8, FIG. 15 shows $\pi(MS_L)$ plots of the combination of corresponding $\pi(M_L)$ and $\pi(S_L)$ trajectories. Utilizing respective supersmoothed Friedman lineplots for respective $\pi(M_{Z*})$=F{average($n_{ijA*}$)} mortality data and $\pi(S_{A*})$=F{average ($n_{ijA*}$)} survivorship data from FIG. 11, FIG. 16 shows $\pi(MS_A)$ plots of the combination of corresponding $\pi(M_A)$ and $\pi(S_A)$ trajectories.

Figure 17:
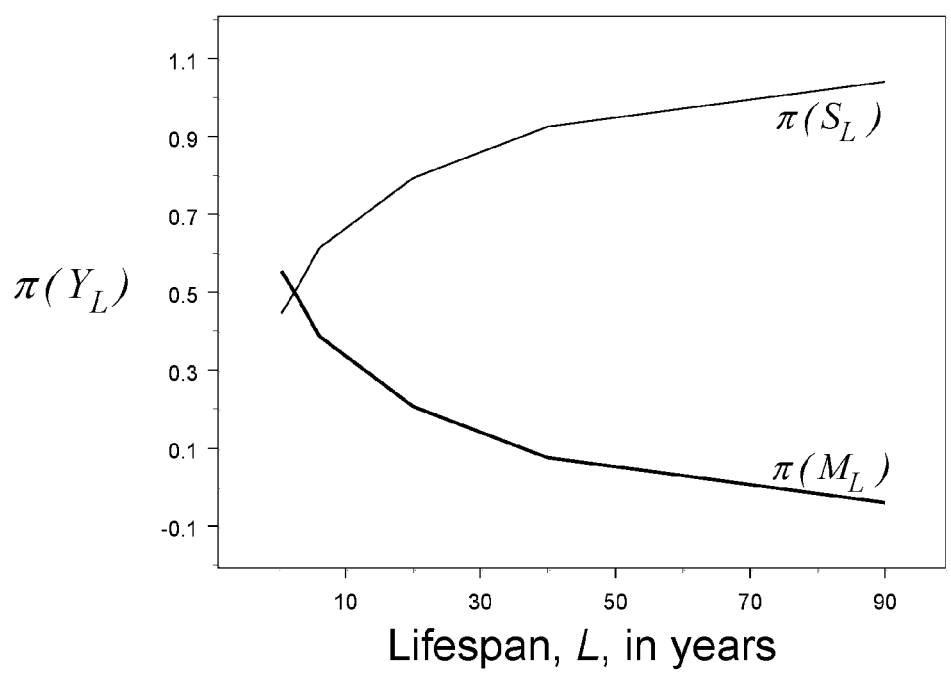
FIG. 17 depicts a plot of another kind of averaged lifespan-specific probabilities of mortality and survivorship by lifespan, in accordance with an aspect of the present invention.

Utilizing respective supersmoothed Friedman lineplots for respective $\pi(M_{L*})$=F{average($n_{ijL*}$)} and $\pi(S_{L*})$=F{average($n_{ijL*}$)} data from FIG. 8, FIG. 17 shows $\pi(MS_L)$ plots of the combination of corresponding $\pi(M_L)$ and $\pi(S_L)$ trajectories. Utilizing respective supersmoothed Friedman lineplots for respective $\pi(M_{A*})$=average{F($n_{ijA*}$)} mortality data and $\pi(S_{A*})$=average{F($n_{ijA*}$)} survivorship data from FIG. 11, FIG. 18 shows $\pi(MS_A)$ plots of the combination of corresponding $\pi(M_A)$ and $\pi(S_A)$ trajectories.

Figure 19:
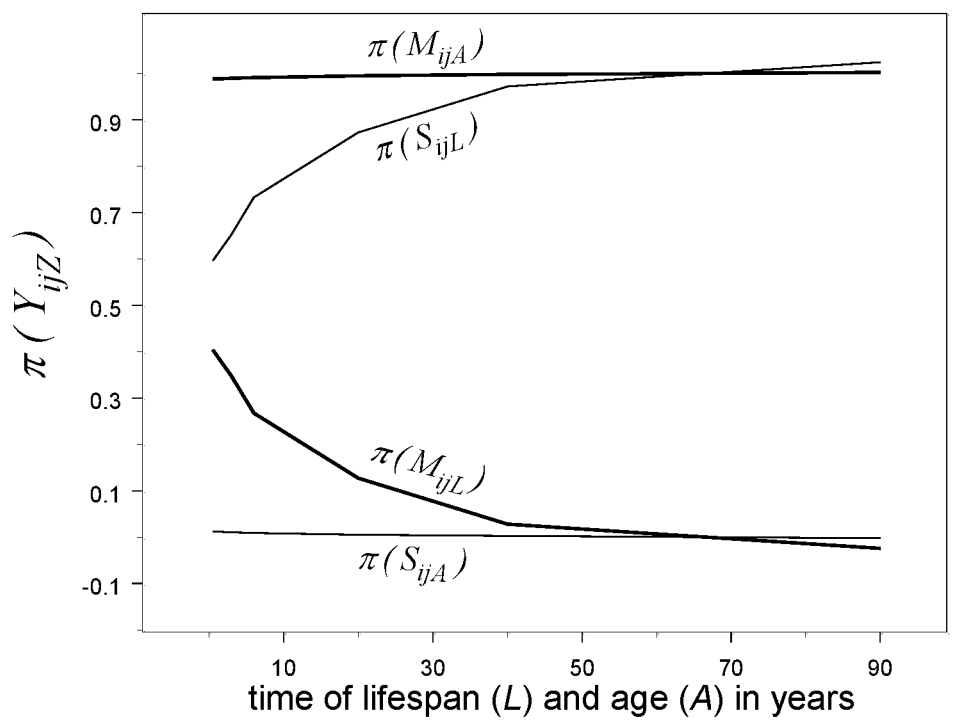
FIG. 19 depicts a plot of individualized lifespan-specific and age-specific probabilities of mortality and survivorship by time of age and lifespan, in accordance with an aspect of the present invention.

As noted, $\pi(MS_{ijZ+})$ denotes the combination of corresponding $\pi(MS_{ijZ})$ at at least two specifically selected Z* values of at least two variables Z). Utilizing respective supersmoothed Friedman lineplots for respective $\pi(M_{ijL*})$ and $\pi(S_{ijL*})$ data from FIG. 8 and FIG. 13, and utilizing respective supersmoothed Friedman lineplots for respective $\pi(M_{ijA*})$ and $\pi(S_{ijA*})$ data from FIG. 11 and FIG. 14, FIG. 19 shows $\pi(MS_{ijZ+})$ plots of the combination of corresponding $\pi(M_{ijL})$, $\pi(S_{ijL})$, $\pi(M_{ijA})$, and $\pi(S_{ijA})$ trajectories.

Figure 20:
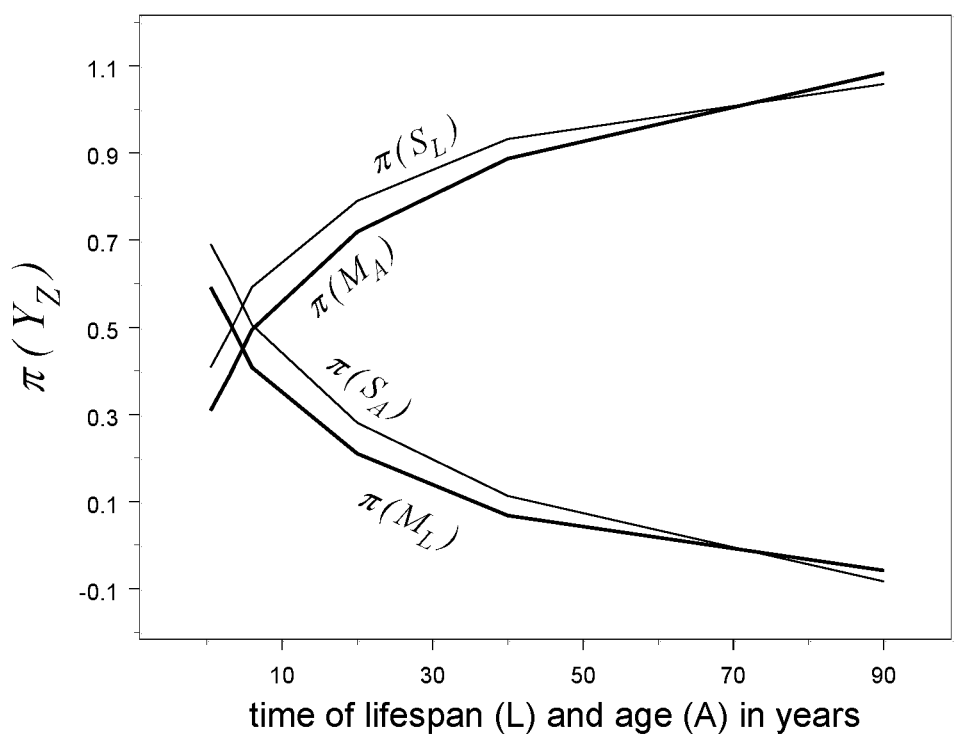
FIG. 20 depicts a plot of one kind of averaged lifespan-specific and age-specific probabilities of mortality and survivorship by time of age and lifespan, in accordance with an aspect of the present invention.

As noted, $\pi(MS_{Z+})$ denotes the combination of at least two corresponding $\pi(MS_Z)$ of at least two variables Z. Utilizing respective supersmoothed Friedman lineplots for respective $\pi(M_{L*})$=F{average($n_{ijL*}$)} and $\pi(S_{L*})$=F{average ($n_{ijL*}$)} data from FIG. 8 and FIG. 15, and utilizing respective supersmoothed Friedman lineplots for respective $\pi(M_{Z*})$=F{average($n_{ijA*}$)} mortality data and $\pi(S_{A*})$=F{average($n_{ijA*}$)} survivorship data from FIG. 11 and FIG. 16, FIG. 20 shows $\pi(MS_{Z+})$ plots of the combination of corresponding $\pi(M_L)$, $\pi(S_L)$, $\pi(M_A)$, and $\pi(S_A)$ trajectories.

Figure 18:
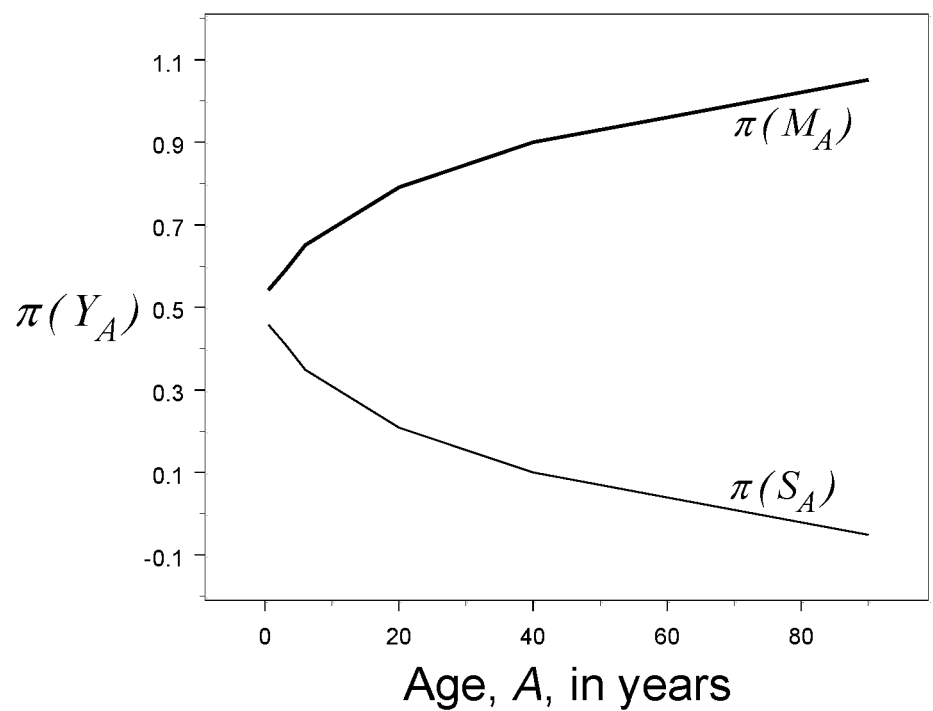
FIG. 18 depicts a plot of another kind of averaged age-specific probabilities of mortality and survivorship by age, in accordance with an aspect of the present invention.
Figure 21:
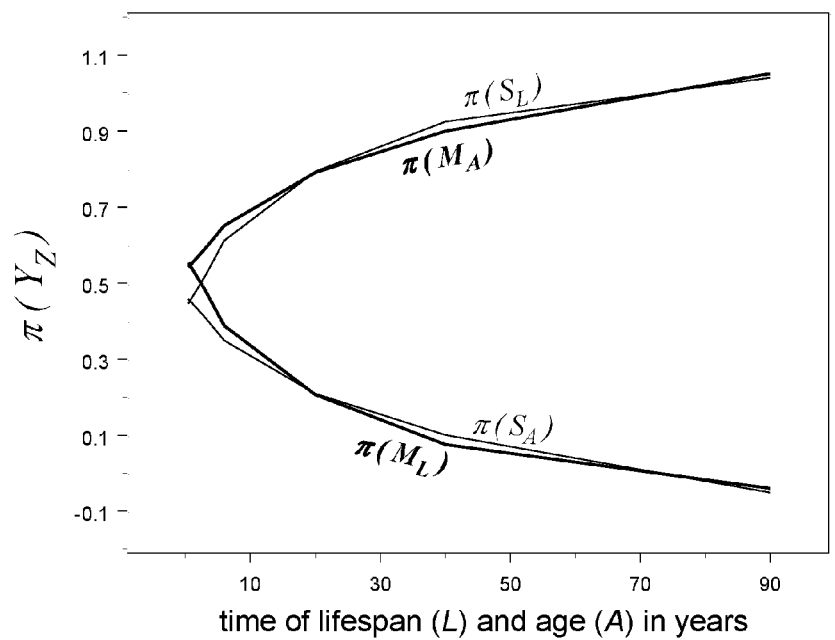
FIG. 21 depicts a plot of another kind of averaged lifespan-specific and age-specific probabilities of mortality and survivorship by time of age and lifespan, in accordance with an aspect of the present invention.

Utilizing respective supersmoothed Friedman lineplots for respective $\pi(M_{L*})$=F{average($n_{ijL*}$)} and $\pi(S_{L*})$=average{F($n_{ijL*}$)} data from FIG. 8 and FIG. 17, and utilizing respective supersmoothed Friedman lineplots for respective $\pi(M_{A*})$=average{F($n_{ijA*}$)} mortality data and $\pi(S_{A*})$=average{F($n_{ijA*}$)} survivorship data from FIG. 11 and FIG. 18, FIG. 21 shows $\pi(MS_{Z+})$ plots of the combination of corresponding $\pi(M_L)$, $\pi(S_L)$, $\pi(M_A)$, and $\pi(S_A)$ trajectories.

As noted, an "average" refers here to a statistical measure of location or central tendency, such as a mean (e.g., arithmetic, geometric, harmonic, or other mean), median, or mode. Whereas FIG. 11 presents respective $\pi(M_{A*})$=average{F($n_{ijA*}$)} and $\pi(M_{A*})$=F{average ($n_{ijA*}$)} that are calculated utilizing respective arithmetic means, FIG. 22 presents corresponding respective $\pi(M_{A*})$=average{F ($n_{ijA*}$)} and $\pi(M_{A*})$=F{average($n_{ijA*}$)} that are calculated utilizing respective medians. Respective plots of $\pi(M_{A*})$=average{F($n_{ijA*}$)} and $\pi(M_{A*})$=average{F($n_{ijA*}$)} can then be produced for the data that are presented in FIG. 22.

FIG. 11 to FIG. 22 reveal specifications and plots that are based upon the best-fitting multivariable binary regression analyses of 188,087 data records of 79,164,608 events of death or survival of all individuals that were born in Sweden in decennial years 1760-1930 and died between 1760 and 2008. However, the specifications and plots in FIG. 11 to FIG. 22 are restricted to the 19,394 events of death or survival in Sweden 1760-2008 that are shown in the tables of FIG. 3, FIG. 6 and FIG. 7. Methods and procedures for the specifications and plots of all events of death or survival in Sweden 1760-2008 are those that have been shown here in reference to FIG. 11 to FIG. 22. Moreover, these methods and procedures are applicable to all other events of death or survival of all kinds of individuals, as will be apparent to those skilled in the art.

In contradistinction with previous research on mortality or survivorship, the data and analyses that are presented here include lifespan and lifespan aggregate variables and distinguish here among age, lifespan, lifespan aggregate size, and contemporary aggregate size. Excepting Applicant's U.S. Provisional Patent Application No. 61/962,502 and Epelbaum (2014), previous multivariable binary analyses of mortality or survivorship did not include distinct lifespan and lifespan aggregate variables. Moreover, said previous analyses did not distinguish age, lifespan, lifespan aggregate, and contemporary aggregate.

The following paragraphs present additional embodiments of the invention; these embodiments include and distinguish age, lifespan, lifespan aggregate size, and contemporary aggregate size in multivariable binary regression analysis of medflies' mortality or survivorship.

The data on mortality or survivorship of Mediterranean fruit flies—Ceratitis capitata, commonly known as medflies—were collected in 1991 at the Moscamed medflies mass-rearing facility in Metapa, a small village located about 20 kilometers from the city of Tapachula in the state of Mexico. The original Moscamed data file contains information on numbers of age-cage-and-sex-specific deaths of 1,203,646 male and female medflies, where medflies are distributed in 167 cages, and the numbers of age-cage-sex-specific dead individuals are counted daily. The original Moscamed data are stored in the memory of a computer in California, and—in this embodiment—these data are transmitted through the internet to the memory of a computer in Tennessee. A processor of a computer in Tennessee processes these Moscamed data and compiles them into pluralized data on age-cage-and-sex-specific deaths of 1,203,646 male and female medflies that are distributed in 167 cages. Computer intensive analyses impose restrictions on the size of the data file that is analyzed here. Therefore, the analytic data file is restricted here to cases of physical size #5 and birth aggregate batch #2. In these selected cases, individuals lived and died in one of thirteen cages, where the cages averaged 3,646.3 sex-specific medflies per cage at age 0 to 1 days. The analyst further instructed the processor to process these pluralized data and convert them to individualized data of daily events of each individual's death or survival; parts of these individualized data are illustrated here in FIG. 23, in accordance with an aspect of the present invention.

As depicted in FIG. 23, each row depicts one data record containing data on the following: one individual in a specific situation (i denotes the individual and j denotes the situation, the situation refers here to events occurring during a specific day in the life of the respective individual medfly), this individual's death or survival (depicted in columns $M_{ij}$ and $S_{ij}$, respectively denoting mortality or survivorship of individual i at situation j in FIG. 23), this individual's sex (depicted in column $G_{ij}$, wherein $G_{ij}$=1 denotes being female, and $G_{ij}$=0 denotes being male in FIG. 23), this individual's age during this situation (during the mid-day, depicted in column $A_{ij}$ in FIG. 23), this individual's lifespan (depicted in column $L_{ij}$ and including the mid-day of the last day of life of this individual, in FIG. 23), this individual's environmental context (depicted as a specific cage in column $E_{ij}$ in FIG. 23), the individual's lifespan aggregate size (i.e., number of corresponding age-lifespan-day-cage-sex-specific identical individuals, this is the number of age-lifespan-day-cage-sex-specific individuals with identical birth day and identical death day to the criterion individual, as depicted in column $\Lambda_{ij}$ in FIG. 23), the individual's contemporary aggregate size (i.e., the number of age-day-cage-sex-specific-identical individuals that are exposed to the risk of death and prospect of survival during this situation, i.e., during the specific day, as depicted in column $C_{ij}$ in FIG. 23). The resultant data file contains 50,716 data records, wherein each record is weighted for depicting 2,211,782 situations j involving respective individuals i, wherein the individual's lifespan aggregate size (i.e., as depicted in column $A_{ij}$ in FIG. 23) is the weighting variable in the analyses, and wherein J (i.e., the total number of situations j of each specific individual) varies among individuals.

Based upon previous research, theoretical knowledge, and the available data, the analyst selected the following denoted variables: Age, lifespan, lifespan aggregate size, contemporary aggregate size, environmental context (i.e., cage), and sex. These denoted variables are respectively denoted here with $A_{ij}$, $L_{ij}$, $C_{ij}$, $\Lambda_{ij}$, $E_{ij}$, and $G_{ij}$ for an individual i at situation j; in these denotations A denotes age (in years), L denotes lifespan (in years), C denotes contemporary aggregate size, $\Lambda$ (the Greek capital letter Lambda) denotes lifespan aggregate size, E denotes environmental context, and G denotes sex. Numerical values for these denoted variables for individuals i at situations j are illustrated here in FIG. 23.

Analyst employed forward selection methods in iterative multivariable binary regression analyses of medflies' mortality or survivorship to select transformations of each of denoted variables $A_{ij}$, $L_{ij}$, $C_{ij}$, $\Lambda_{ij}$, $E_{ij}$, and $G_{ij}$ for an individual i at situation/. In these iterative analyses analyst tested power transformations of each of these denoted variables, selecting transformation that improved AIC and BIC. In these analyses, analyst conducted iterative multivariable binary regression analyses of medflies' mortality or survivorship. The initial iterating multivariable binary regression analyses utilized diverse input models $n_{ij}=\beta_0+\beta_1 X_{1ij}+\beta_2 X_{2ij}+\beta_3 X_{3ij}$ with respective logit, probit, and complementary log-log binary link functions—as well as $X_1=G_{ij}$, $X_2=E_{ij}$ and diverse values of power coefficient p in $X_3=(A_{ij})^p$ wherein G denotes sex, E denotes environmental context, and A denotes age—for one of $Y_{ij}=M_{ij}$ and $Y_{ij}=S_{ij}$; these iterative analyses sought to optimize AIC and BIC best-fitting values, selecting the power coefficient p beyond which AIC and BIC cease to improve, ensuring that all regression coefficients in the selected model are significant beyond the 0.05 level. Utilizing said selected power coefficient p in $X_{3ij}=(A_{ij})^p$, analyst proceeded to conduct further iterative multivariable binary regression analyses with input model $n_{ij}=\beta_0+\beta_1 X_{1ij}+\beta_2 X_{2ij}+\beta_3 X_{3ij}+\beta_4 X_{4ij}$ and logit, probit, and complementary log-log binary link functions for one of $Y_{ij}=M_{ij}$ and $Y_{ij}=S_{ij}$ to find optimal AIC and BIC values for diverse values of power coefficient p in $X_{4ij}=(L_{ij})^p$. Utilizing these forward selection methods per additional respective denoted variable, the analyst continued to select optimal power coefficients p in such iterative transformations of respective denoted variables in $X_{5ij}=(C_{ij})^p$ and $X_{6ij}=(\Lambda_{ij})^p$ in respective input models until reaching an optimal best-fitting first-degree polynomial input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}$. Utilizing said respective selected optimal first-degree polynomial power coefficients p, the analyst continued to test the optimality of second degree polynomial transformations for these respective selected power coefficients p, optimizing optimal AIC and BIC best-fitting criteria in such iterative transformations of respective denoted variables in $X_{7ij}=\{(A_{ij})^p\}^2$, $X_{8ij}=\{(L_{ij})^p\}^2$, $X_{9ij}=\{(C_{ij})^p\}^2$, and $X_{10ij}=\{(\Lambda_{ij})^p\}^2$ in respective input models until reaching an optimal second-degree powered polynomial input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}$. Utilizing said respective selected optimal first-degree and second-degree polynomials power coefficients p, the analyst continued to test the optimality of third-degree polynomial transformations for these respective selected power coefficients p, finding that respective $X_{11ij}=\{(A_{ij})^p\}^3$, $X_{11ij}=\{(L_{ij})^p\}^3$, $X_{11ij}=\{(C_{ij})^p\}^3$, and $X_{11ij}=\{(\Lambda_{ij})^p\}^3$ failed to improve AIC and BIC best-fitting criteria in such iterative transformations. In all these iterative analyses, the analyst used non-negative values of power coefficient p (in the interest of investigating power laws), utilizing the natural logarithmic transformation when p=0 (e.g., using $X_1=\ln(A_{ij})$ instead of $X_1=(A_{ij})^0$), and allowing identity transformation (e.g., when p=1, e.g., using $X_1=(A_{ij})^1=A_{ij}$), ensuring that all regression coefficients in respective selected best-fitting models are significant beyond the 0.05 level of significance. Moreover, all analyses employed random effects input models. Further information on these analyses is available in Epelbaum (2014).

In the best-fitting multivariable binary regression analysis of medflies' mortality, the analyst created a data set consisting of variable $Y_{ij}$ and 10 variables $X_{vij}$ for 50,716 data records, wherein each respective record is variably weighted for depicting a total of 2,211,782 situations j involving all individuals of physical size #5 and birth aggregate batch #2 in thirteen specific cages in the Moscamed study. These best-fitting analyses employed a best-fitting input model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}$ and a logit link function $B(n_{ij})=\ln\{-\ln(1-n_{ij})\}$, employing an identity transformation of denoted binary variable $G_{ij}$, an identity transformation of denoted categorical variable $E_{ij}$, as well as first-degree and second-degree polynomial transformations of denoted powered variables $A_{ij}$, $L_{ij}$, $C_{ij}$, and $\Lambda_{ij}$ for a respective individual i in a respective situation j, wherein $Y_{ij}=M_{ij}$, $X_{1ij}=G_{ij}$, $X_{2ij}=E_{ij}$, $X_{3ij}=(A_{ij})^{0.13}$, $X_{4ij}=(L_{ij})^{0.98}$, $X_{5ij}=(C_{ij})^{1.02}$, $X_{6ij}=(\Lambda_{ij})^{0.95}$, $X_{7ij}=\{(A_{ij})^{0.13}\}^2$, $X_{8ij}=\{(L_{ij})^{0.98}\}^2$, $X_{9ij}=\{(C_{ij})^{1.02}\}^2$, and $X_{10ij}=\{(\Lambda_{ij})^{0.95}\}^2$, wherein, as noted and as illustrated in FIG. 23, i denotes an individual, j is a consecutive number of the day of life of this individual, $M_{ij}=1$ when the individual is dead, and $M_{ij}=0$ when the individual is not dead, $A_{ij}$ denotes the individual's age (in days) at situation j, $L_{ij}$ denotes the individual's lifespan (in days) at situation j, $C_{ij}$ denotes the individual's contemporary aggregate size at situation j, $\Lambda_{ij}$ denotes the individual's lifespan aggregate size at situation j, $E_{ij}$ denotes the individual's environmental context (i.e., indicated by cage, where E denotes environmental context transformed to a sequential number) at situation j, $G_{ij}=1$ when the individual is female, and $G_{ij}=0$ when the individual is male. The best-fitting multivariable binary regression analyses of medflies' mortality yielded a best-fitting estimated model $n_{ij}=\beta_0+\beta_1 X_{1ij}+\beta_2 X_{2ij}+\beta_3 X_{3ij}+\beta_4 X_{4ij}+\beta_5 X_{5ij}+\beta_6 X_{6ij}+\beta_7 X_{7ij}+\beta_8 X_{8ij}+\beta_9 X_{9ij}+\beta_{10} X_{10ij}$ with an $F(n_{ij})=1/\{1+\exp(-n_{ij})\}=\{\exp(n_{ij})\}/\{1+\exp(n_{ij})\}$ cumulative distribution function corresponding to said logit binary link function $B(n_{ij})=\ln\{n_{ij}/(1-n_{ij})\}$. Utilizing corresponding best-fitting estimated regression coefficients, and utilizing respective denoting variables, the best-fitting estimated model is specified with $n_{ij}=1391.92-2,648.52(A_{ij}^{0.13})+1295.76(A_{ij}^{0.13})^2-16.67(L_{ij}^{0.98})+0.095(L_{ij}^{0.98})^2-0.006(C_{ij}^{1.02})+(6.85e-07)(C_{ij}^{1.02})^2-0.09(\Lambda_{ij}^{0.95})+$ $0.00026(\Lambda_{ij}^{0.95})^2 - 1.83(G_{ij}) + \{-1.42(E_{i1}) + 0.63(E_{i2}) + 0.76(E_{i3}) + 1.59(E_{i4}) + 2.80(E_{i5}) + 0.997(E_{i6}) - 4.42(E_{i7}) + 2.043(E_{i8}) + 3.96(E_{i9}) + 0.863(E_{i10}) + 2.069(E_{i11}) + 1.65(E_{i12}) + 1.00(E_{i13})\}$, where only one of the $E_{ic}$ terms within applies in each corresponding specification of a specific cage; the probability of mortality $\pi(M_{ij})$ for this estimated model is calculated with $\pi(M_{ij}) = F(n_{ij}) = 1/\{1 + \exp(-n_{ij})\} = \{\exp(n_{ij})\}/\{1 + \exp(n_{ij})\}$ wherein said cumulative distribution function $F(n_{ij})$ corresponding to said logit binary link function $B(n_{ij}) = \ln\{n_{ij}/(1 - n_{ij})\}$. In contradistinction with previous research on mortality, the data and models distinguish age, lifespan, lifespan aggregate, and contemporary aggregate; the data and variables include specific independent variables $X_{vij}$ denoting respective age, lifespan, lifespan aggregate size, and contemporary aggregate size variables. Excepting Applicant's U.S. Provisional Patent Application No. 61/962,502 and Applicant's Epelbaum (2014), previous multivariable binary regression analyses of mortality did not include the lifespan and lifespan aggregate variables, and did not distinguish age, lifespan, lifespan aggregate size, and contemporary aggregate size.

In the best-fitting multivariable binary regression analysis of medflies' survivorship, the analyst employed the corresponding data set consisting of variable $Y_{ij} = S_{ij}$ and 10 variables $X_{vij}$ for 50,716 data records, wherein each record is relatively weighted for depicting a total of 2,211,782 situations j involving all individuals of physical size #5 and birth aggregate batch #2 in thirteen specific cages in the Moscamed study. These best-fitting analyses of medflies' survivorship employed a best-fitting input model $n_{ij} = \beta_0 + \beta_1 X_{1ij} + \beta_2 X_{2ij} + \beta_3 X_{3ij} + \beta_4 X_{4ij} + \beta_5 X_{5ij} + \beta_6 X_{6ij} + \beta_7 X_{7ij} + \beta_8 X_{8ij} + \beta_9 X_{9ij} + \beta_{10} X_{10ij}$ and a complementary log-log binary link function $B(n_{ij}) = \ln\{-\ln/(1 - n_{ij})\}$, wherein $Y_{ij} = S_{ij}$, $X_{1ij} = G_{ij}$, $X_{2ij} = E_{ij}$, $X_{3ij} = (A_{ij})^{0.16}$, $X_{4ij} = (L_{ij})^{0.94}$, $X_{5ij} = (C_{ij})^{1.02}$, $X_{6ij} = (\Lambda_{ij})^{0.88}$, $X_{7ij} = \{(A_{ij})^{0.16}\}^2$, $X_{8ij} = \{(L_{ij})^{0.94}\}^2$, $X_{9ij} = \{(C_{ij})^{1.02}\}^2$, and $X_{10ij} = \{(\Lambda_{ij})^{0.88}\}^2$; FIG. 24 presents computer instructions for said input model and said complementary log-log link function. As illustrated in FIG. 23, i denotes an individual, j is a consecutive number of the day of life of this individual, $S_{ij} = 1$ when the individual is alive, and $S_{ij} = 0$ when the individual is not alive, $A_{ij}$ denotes the individual's age (in days) at situation j, $L_{ij}$ denotes the individual's lifespan (in days) at situation j, $C_{ij}$ denotes the individual's contemporary aggregate size at situation j, $\Lambda_{ij}$ denotes the individual's lifespan aggregate size at situation j, $E_{ij}$ denotes the individual's environmental context (i.e., indicated by cage) at situation j (where E denotes environmental context transformed to a sequential number), and $G_{ij} = 1$ when the individual is female, and $G_{ij} = 0$ when the individual is male. The best-fitting multivariable binary regression analyses of medflies' survivorship yielded a best-fitting estimated model $n_{ij} = \beta_0 + \beta_1 X_{1ij} + \beta_2 X_{2ij} + \beta_3 X_{3ij} + \beta_4 X_{4ij} + \beta_5 X_{5ij} + \beta_6 X_{6ij} + \beta_7 X_{7ij} + \beta_8 X_{8ij} + \beta_9 X_{9ij} + \beta_{10} X_{10ij}$ with an $F(n_{ij}) = 1 - \exp\{-\exp(n_{ij})\}$ cumulative distribution function corresponding to said complementary log-log binary link function $B(n_{ij}) = \ln\{-\ln/(1 - n_{ij})\}$.

Computer instructions for said input model and said complementary log-log binary link function are shown in FIG. 24. A computer output for this estimated model is depicted in FIG. 25. Utilizing corresponding best-fitting estimated regression coefficients that are depicted in FIG. 25, and utilizing respective denoting variables that correspond to variables $X_{vij}$, the best-fitting estimated model is specified with $n_{ij} = -732.74 + 1402.49(A_{ij}^{0.16}) - 706.62(A_{ij}^{0.16})^2 + 19.24(L_{ij}^{0.94}) - 0.12(L_{ij}^{0.94})^2 + 0.0041(C_{ij}^{1.02}) - (4.03\text{E-}07)(C_{ij}^{1.02})^2 + 0.11(\Lambda_{ij}^{0.88}) - 0.000491(\Lambda_{ij}^{0.88})^2 + 1.28(G_{ij}) + \{+0.96(E_{i1}) - 0.669(E_{i2}) - 1.03(E_{i3}) - 0.75(E_{i4}) - 1.53(E_{i5}) - 0.0.52(E_{i6}) + 3.25(E_{i7}) - 1.15(E_{i8}) - 2.63(E_{i9}) + 0.83(E_{i10}) - 1.12(E_{i11}) - 0.53(E_{i12}) + 1.00(E_{i13})\}$, where only one of the $E_{ic}$ terms within applies in each corresponding specification for a specific cage. The probability of survivorship $\pi(S_{ij})$ corresponding to said best-fitting estimated model is calculated with $\pi(S_{ij}) = F(n_{ij}) = 1 - \exp\{-\exp(n_{ij})\}$ wherein said cumulative distribution function corresponds to said complementary log-log binary link function $B(n_{ij}) = \ln\{-\ln/(1 - n_{ij})\}$.

Utilizing said model and said cumulative distribution function $F(n_{ij})$, FIG. 26 shows selected $n_{ij}$ values and selected $\pi(S_{ij})$ values that correspond to the data that are shown in FIG. 23. These values also correspond to the computer program that is shown in FIG. 24, these values further correspond to the results that are shown in FIG. 25.

Utilizing said model and said cumulative distribution function $F(n_{ij})$, FIG. 27 shows individualized lifespan-specific probabilities of survivorship $\pi(S_{ijL*})$ and averaged lifespan-specific probabilities of survivorship $\pi(S_{L*})$ of selected individual medflies at selected situations and at specific lifespan levels L*. These values also correspond to the computer program that is shown in FIG. 24, these values further correspond to the results that are shown in FIG. 25.

As noted, in correspondence to the respective best-fitting multivariable binary regression analyses, the individualized probability of medflies' survivorship $\pi(S_{ij})$ is calculated with $\pi(S_{ij}) = F(n_{ij}) = 1 - \exp\{-\exp(n_{ijj})\}$ wherein said cumulative distribution function $F(n_{ij})$ corresponds to the best-fitting complementary log-log binary link function $B(n_{ij}) = \ln\{-\ln/(1 - n_{ij})\}$. In contrast, in correspondence to the respective best-fitting multivariable binary regression analyses, the respective individualized probability of medflies' mortality $\pi(M_{ij})$ and the individualized probability of humans' mortality $\pi(M_{ij})$ and survivorship $\pi(S_{ij})$ were calculated with $F(n_{ij}) = 1/\{1 + \exp(-n_{ij})\} = \{\exp(n_{ij})\}/\{1 + \exp(n_{ij})\}$ wherein said cumulative distribution function $F(n_{ij})$ corresponds to the best-fitting logit binary link function $B(n_{ij}) = \ln\{n_{ij}/(1 - n_{ij})\}$. These considerations illustrate that the methods and procedures that are shown here are applicable to diverse kinds of binary link functions.

The foregoing best-fitting multivariable binary regression analyses of medflies' mortality and survivorship provide the foundation for specifications and plots of medflies' individualized Z-specific probabilities of mortality or survivorship $\pi(Y_{ijZ})$, averaged Z-specific probabilities of mortality or survivorship $\pi(Y_Z)$, individualized Z-specific probabilities of mortality and survivorship $\pi(MS_{ijZ})$, averaged Z-specific probabilities of mortality and survivorship $\pi(MS_Z)$, individualized Z+-specific probabilities of mortality and survivorship $\pi(MS_{ijZ+})$, and averaged Z+-specific probabilities of mortality and survivorship $\pi(MS_{Z+})$. The methods and procedures for these specifications and plots of medflies' mortality and survivorship are same as the methods and procedures that have been applied here in the presentation of these specifications and plots of humans' mortality and survivorship, as shown here in reference to FIG. 11 to FIG. 22. Moreover, these methods and procedures are applicable to all other events of death or survival of all kinds of individuals, as would be apparent to those skilled in the art.

Excepting Applicant's U.S. Provisional Patent Application No. 61/962,502 and Epelbaum (2014), previous investigations of mortality and survivorship did not include—and did not distinguish—independent variables that denote lifespan in multivariable binary regression analyses of mortality and survivorship. The analyses that are presented show that these inclusion and distinction of such independent variables provide valuable explanatory insights about mortality and survivorship in diverse species. The analyses that are presented here also provide hitherto unavailable explanatory insights about lifespan aggregates in mortality and survivorship in respective distinctions from age and contemporary aggregates. Moreover, the analyses that are presented here improve goodness-of-fit and prediction.

Finally, while the invention has been described by way of examples of multivariable binary regression analyses of humans' and medflies' mortality or survivorship and in terms of the above, it is to be understood that the invention is not limited to the disclosed embodiments. On the contrary, it is intended to cover diverse kinds of multivariable binary regression analyses and computing environments and various modifications that would be apparent to those skilled in the art.

REFERENCES

Andrade, H., B. Gedik, V. Kumar, and K. L. Wu. 2014. Managing resource allocation and configuration of model building components of data analysis applications, U.S. Pat. No. 8,645,966 B2.

Chu, Yea J, Sler Han, Jing-Yun Shyr, and Jing Xu. 2016. Missing value imputation for predictive models, U.S. Pat. No. 9,443,194 B2.

Chu, Yea J, Dong Liang, and Jing-Yun Shyr. 2015. Computing regression models, U.S. Pat. No. 9,152,921 B2.

Epelbaum, M. 2014. Lifespan and aggregate size variables in specifications of mortality or survivorship. PLoS ONE 9(1):e84156.

Gündüz, Necla and Ernest Fokoué. 2015. "On the predictive properties of binary link functions." arXiv: 1502.04742v1.

Hilbe, Joseph M. 2009. Logistic Regression Models. CRC Press: Boca Raton.

Kenyon, C., J. Apfeld, A. Dillin, D. Garigan, A. L. A. Hsu, J. Lehrer-Graiwer, and C. Murphy. 2010. Eukaryotic genes involved in adult lifespan regulation, U.S. Pat. No. 7,794,957 B2.

Kramer, A. A. 2013. Multi-stage model for predicting probabilities of mortality in adult critically ill patients, U.S. Pat. No. 8,417,541 B1.

Li, Dan, Xia Wang, Lizhen Lin, and Dipak K. Dey. 2016. Flexible link functions in nonparametric binary regression with Gaussian process priors. Biometrics 72(3): 707-719.

Royston, Patrick and Willi Sauerbrei. 2008. Multivariable model-building. Wiley: West Sussex, England.

What is claimed is:

1. A method for including and distinguishing lifespan in multivariable binary regression analysis of one of mortality and survivorship, said method comprising:

at least one of obtaining and creating data about N individuals i at respective J situations j, said data including variable $Y_{ij}$ and at least two variables $X_{vij}$;

conducting a multivariable binary regression analysis of said data, analyzing the relationship between a dependent variable $Y_{ij}$ and independent variables $X_{vij}$ for one of $Y_{ij}=M_{ij}$ and $Y_{ij}=S_{ij}$, said analyzing utilizing model $n_{ij}=\beta_0+\beta_v X_{vij}+ \ldots +\beta_W X_{Wij}$ and binary link function $B(n_{ij})$;

effectuating said multivariable binary regression analysis into yielding at least one result of said analysis;

wherein at least one of the steps is carried out by a computer; and wherein:

i=1:N, indicating that i are sequential positive integers 1 through N;

i denotes an individual;

N denotes the total number of individuals i in said data;

j=1:J, indicating that j are sequential positive integers 1 through J;

j denotes a situation of individual i in reference to said variables $X_{vij}$ and $Y_{ij}$;

J denotes the total number of situations of an individual i in said data, allowing distinct J for distinct individuals i;

$M_{ij}$ denotes the mortality status of individual i at situation j;

$S_{ij}$ denotes the survivorship status of individual i at situation j;

$Y_{ij} \in \{0,1\}$, indicating that $Y_{ij}$ is a binary variable that adopts one of values 0 and 1 for one of $Y_{ij}=M_{ij}$ and $Y_{ij}=S_{ij}$ of individual i at situation j;

v=1:W, indicating that v are sequential positive integers 1 through W;

$W \geq 2$;

v denotes an index of each of the following: variables $X_v$, variables $X_{vij}$ of individual i at situation j, and coefficients $\beta_v$;

W denotes the following: total number of variables $X_v$, total number of variables $X_{vij}$ of individual i at situation j, and total number of coefficients $\beta_v$;

$X_{vij}$ denotes a variable $X_v$ of individual i at situation j;

r=1:R, indicating that r are sequential positive integers 1 through R;

$R \geq 2$;

$W \geq R$;

r denotes an index of each of the following: variables $K_r$ and variables $K_{rij}$;

$K_r$ denotes a variable that directly denotes a distinct phenomenon, and R respective variables $K_r$ respectively directly denote R distinct phenomena;

$K_{rij}$ denotes a variable $K_r$ of individual i at situation j;

T denotes a transformation function, allowing identity transformation;

q=1:Q, indicating that q are sequential positive integers 1 through Q;

$X_v=T_q(K_r)$, indicating that $X_v$ is a transformation $T_q$ of variable $K_r$ that directly denotes a specific phenomenon, further indicating that $X_v$ indirectly denotes said specific phenomenon;

$X_{vij}=T_q(K_{rij})$, indicating that $X_{vij}$ is a transformation $T_q$ of $K_{rij}$ that directly denotes a specific phenomenon, further indicating that $X_{vij}$ indirectly denotes said specific phenomenon;

Q denotes the total number of transformations $T_q(K_r)$ for a specific $K_r$, and Q also denotes the the total number of transformations $T_q(K_{rij})$ for a specific $K_{rij}$ of individual i at situation j, allowing distinct Q for distinct variables $K_r$, and allowing distinct Q for distinct variables $K_{rij}$ of individual i at situation j;

R denotes the following: the total number of variables $K_r$, the total number of variables $K_{rij}$ of individual i at situation j, the total number of phenomena denoted by variables $K_r$, and the total number of phenomena denoted by variables $K_{rij}$ of individual i at situation j;

A directly denotes age;

L directly denotes lifespan;

$K_1=A$ and $K_2=L$, indicating that one of at least two variables $K_r$ directly denotes age, and indicating that another of said at least two variables $K_r$ directly denotes lifespan;

$K_{1ij}=A_{ij}$ and $K_{2ij}=L_{ij}$, indicating that one of at least two variables $K_{rij}$ directly denotes the age of individual i at situation j, and indicating that another of said at least two variables $K_{rij}$ directly denotes the lifespan of individual i at situation j;

β denotes a regression coefficient; and $β_0$ denotes the regression coefficient for the intercept, allowing $β_0$ to be one of the following: estimated, suppressed, and user-provided.

2. The method of claim 1, further comprising estimating $π(Y_{ij})$ for one of $π(Y_{ij})=π(M_{ij})$ and $π(Y_{ij})=π(S_{ij})$, said estimating utilizing $π(Y_{ij})=F(n_{ij})$, wherein:

$π(M_{ij})$ denotes the probability of mortality of individual i at situation j;

$π(S_{ij})$ denotes the probability of survivorship of individual i at situation j;

$n_{ij}$ denotes $n_{ij}$ resulting from said multivariable binary regression analysis;

$F(n_{ij})$ denotes the cumulative distribution function of $n_{ij}$; and function $F(n_{ij})$ corresponds to function $B(n_{ij})$.

3. The method of claim 2, further comprising estimating at least one of $π(Y_{ijZ*})$ and $π(Y_{Z*})$, said estimating of at least one of $π(Y_{ijZ*})$ and $π(Y_{Z*})$ utilizing $n_{ijZ*}=β_0+Σβ_vZ*+Σβ_vX_{vij-Z}$, said estimating of $π(Y_{ijZ*})$ also utilizing $π(Y_{ijZ*})=F(n_{ijZ*})$, and said estimating of $π(Y_{Z*})$ also utilizing at least one of $π(Y_{Z*})=F\{average(n_{ijZ*})\}$ and $π(Y_{Z*})=average\{F(n_{ijZ*})\}$, wherein:

$π(Y_{ijZ*})$ denotes one of $π(Y_{ijZ*})=π(M_{ijZ*})$ and $π(Y_{ijZ*})=π(S_{ijZ*})$ $π(Y_{Z*})$ denotes one of $π(Y_{Z*})=π(M_{Z*})$ and $π(Y_{Z*})=π(S_{Z*})$;

Z denotes a specifically selected variable $K_r$;

said variable Z and said specifically selected variable $K_r$ directly denote a specifically selected phenomenon;

Z* denotes a specifically selected value of variable Z;

$π(M_{ijZ*})$ denotes an individualized specific probability of mortality of individual i at situation j and at a specifically selected value Z* of variable Z;

$π(S_{ijZ*})$ denotes an individualized specific probability of survivorship of individual i at situation j and at a specifically selected value Z* of variable Z;

$π(M_{Z*})$ denotes an averaged specified probability of mortality at a specifically selected value Z* of variable Z;

$π(S_{Z*})$ denotes an averaged specified probability of survivorship at a specifically selected value Z* of variable Z;

$β_vZ*$ denotes a replacement of a $β_vX_{vij}$ in said model $n_{ijZ*}=β_0+β_vX_{vij}+\ldots+β_WX_{Wij}$, wherein variable $K_r$ in $X_{vij}=T_q(K_{rij})$ is said specific variable $K_r$ that is denoted by Z, and wherein $X_{vij}=T_q(Z_{ij})$ for said replaced $β_vX_{vij}$;

$Σβ_vZ*$ denotes the sum of all respective $β_vZ*$ replacements of respective $β_vX_{vij}$ in said model $n_{ij}=β_0+β_vX_{vij}+\ldots+β_WX_{Wij}$;

$X_{vij-Z}$ denotes an $X_{vij}$ wherein variable $K_r$ in $X_{vij}=T_q(K_{rij})$ is not said specific variable $K_r$ that is denoted by Z;

$Σβ_vX_{vij-Z}$ denotes the sum of all $β_vX_{vij-Z}$ in said model $n_{ij}=β_0+β_vX_{vij}+\ldots+β_WX_{Wij}$;

F(·) denotes a cumulative distribution function of (·);

said cumulative distribution function F(·) corresponds to said binary link function $B(n_{ij})$;

average $(n_{ijZ*})$ denotes an average of the respective $n_{ijZ*}$ of at least two individuals i at situation j and at a specifically selected value Z* of variable Z; and average $\{F(n_{ijZ*})\}$ denotes an average of the respective $F(n_{ijZ*})$ of at least two individuals i at situation j and at a specifically selected value Z* of variable Z.

4. The method of claim 3, further comprising at least one of specifying and plotting at least one of the following: $π(Y_{ijZ})$, $π(Y_Z)$, $π(MS_{ijZ})$, $π(MS_Z)$, $π(MS_{ijZ+})$, and $π(MS_{Z+})$; wherein:

$π(Y_{ijZ})$ denotes one of $π(Y_{ijZ})=π(M_{ijZ})$ and $π(Y_{ijZ})=π(S_{ijZ})$;

$π(Y_Z)$ denotes one of $π(Y_Z)=π(M_Z)$ and $π(Y_Z)=π(S_Z)$;

$π(M_{ijZ})$ denotes the $π(M_{ijZ*})$ of an individual i at a situation j and at at least two specifically selected Z* values of variable Z;

$π(S_{ijZ})$ denotes the $π(S_{ijZ*})$ of an individual i at a situation j and at at least two specifically selected Z* values of variable Z;

$π(M_Z)$ denotes the $π(M_{Z*})$ of individuals i at a situation j and at at least two specifically selected Z* values of variable Z;

$π(S_Z)$ denotes at least two $π(S_{Z*})$ of individuals i at a situation j and at at least two specifically selected Z* values of variable Z;

$π(MS_{ijZ})$ denotes corresponding $π(M_{ijZ})$ and $π(S_{ijZ})$ at at least two specifically selected Z* values of variable Z;

$π(MS_Z)$ denotes corresponding $π(M_Z)$ and $π(S_Z)$ at at least two specifically selected Z* values of variable Z;

$π(MS_{ijZ+})$ denotes corresponding $π(MS_{ijZ})$ at at least two specifically selected Z* values of a variable Z and at respective at least two specifically selected Z* values of each of at least one other variable Z; and $π(MS_{Z+})$ denotes corresponding $π(MS_Z)$ at at least two specifically selected Z* values of a variable Z and at respective at least two specifically selected Z* values of each of at least one other variable Z.

5. A system for including and distinguishing lifespan in multivariable binary regression analysis of one of mortality and survivorship, said system in a computing environment, said system comprising:

a processor;

a non-transitory computer readable storage medium connected to the processor, wherein the storage medium has stored thereon at least one of data and instructions, and wherein the processor is configured to execute said instructions;

said processor configured to at least one of obtain and create data about N individuals i at respective J situations j, said data to include variable $Y_{ij}$ and at least two variables $X_{vij}$;

said processor further configured to conduct a multivariable binary regression analysis of said data, said analysis to analyze the relationship between a dependent variable $Y_{ij}$ and independent variables $X_{vij}$ for one of $Y_{ij}=M_{ij}$ and $Y_{ij}=S_{ij}$, said analysis to utilize model $n_{ij}=β_0+β_vX_{vij}+\ldots+β_WX_{Wij}$ and binary link function $B(n_{ij})$;

said processor further configured to effectuate said multivariable binary regression analysis to yield at least one result of said analysis; and wherein:

i=1:N, indicating that i are sequential positive integers 1 through N;

i denotes an individual;

N denotes the total number of individuals i in said data;

j=1:J, indicating that j are sequential positive integers 1 through J;

j denotes a situation of individual i in reference to said variables $X_{vij}$ and $Y_{ij}$;

J denotes the total number of situations of an individual i in said data, allowing distinct J for distinct individuals i;

$M_{ij}$ denotes the mortality status of individual i at situation j;

$S_{ij}$ denotes the survivorship status of individual i at situation j;

$Y_{ij} \in \{0,1\}$, indicating that $Y_{ij}$ is a binary variable that adopts one of values 0 and 1 for one of $Y_{ij}=M_{ij}$ and $Y_{ij}=S_{ij}$ of individual i at situation j;

v=1:W, indicating that v are sequential positive integers 1 through W;

W≥2;

v denotes an index of each of the following: variables $X_v$, variables $X_{vij}$ of individual i at situation j, and coefficients $\beta_v$;

W denotes the following: total number of variables $X_v$, total number of variables $X_{vij}$ of individual i at situation j, and total number of coefficients $\beta_v$;

$X_{vij}$ denotes a variable $X_v$ of individual i at situation j;

r=1:R, indicating that r are sequential positive integers 1 through R;

R≥2;

W≥R;

r denotes an index of each of the following: variables $K_r$ and variables $K_{rij}$;

$K_r$ denotes a variable that directly denotes a distinct phenomenon, and R respective variables $K_r$ respectively directly denote R distinct phenomena;

$K_{rij}$ denotes a variable $K_r$ of individual i at situation j;

T denotes a transformation function, allowing identity transformation;

q=1:Q, indicating that q are sequential positive integers 1 through Q;

$X_v = T_q(K_r)$;

$X_{vij} = T_q(K_{rij})$;

Q denotes the total number of transformations $T_q(K_r)$ for a specific $K_r$, and Q also denotes the the total number of transformations $T_q(K_{rij})$ for a specific $K_{rij}$ of individual i at situation j, allowing distinct Q for distinct variables $K_r$, and allowing distinct Q for distinct variables $K_{rij}$ of individual i at situation j;

R denotes the following: the total number of variables $K_r$, the total number of variables $K_{rij}$ of individual i at situation j, the total number of phenomena denoted by variables $K_r$, and the total number of phenomena denoted by variables $K_{rij}$ of individual i at situation j;

A directly denotes age;

L directly denotes lifespan;

$K_1=A$ and $K_2=L$, indicating that one of at least two variables $K_r$ directly denotes age, and indicating that another of said at least two variables $K_r$ directly denotes lifespan;

$K_{1ij}=A_{ij}$ and $K_{2ij}=L_{ij}$, indicating that one of at least two variables $K_{rij}$ directly denotes the age of individual i at situation j, and indicating that another of said at least two variables $K_{rij}$ directly denotes the lifespan of individual i at situation j;

β denotes a regression coefficient; and $\beta_0$ denotes the regression coefficient for the intercept, allowing $\beta_0$ to be one of the following: estimated, suppressed, and user-provided.

6. In the system of claim 5, said processor further configured to estimate $\pi(Y_{ij})$ for one of $\pi(Y_{ij})=\pi(M_{ij})$ and $\pi(Y_{ij})=\pi(S_{ij})$, said estimating to utilize $\pi(Y_{ij})=F(n_{ij})$, wherein:

$\pi(M_{ij})$ denotes the probability of mortality of individual i at situation j;

$\pi(S_{ij})$ denotes the probability of survivorship of individual i at situation j;

$n_{ij}$ denotes $n_{ij}$ resulting from said multivariable binary regression analysis;

$F(n_{ij})$ denotes the cumulative distribution function of $n_{ij}$; and function $F(n_{ij})$ corresponds to function $B(n_{ij})$.

7. In the sytem of claim 6, said processor further configured to estimate at least one of $\pi(Y_{ijZ*})$ and $\pi(Y_{Z*})$, said estimating of at least one of $\pi(Y_{ijZ*})$ and $\pi(Y_{Z*})$ to utilize $n_{ijZ*}=\beta_0+\Sigma\beta_v Z^* + \Sigma\beta_v X_{vij\sim Z}$, said estimating of $\pi(Y_{ijZ*})$ to also utilize $\pi(Y_{ijZ*})=F(n_{ijZ*})$, and said estimating of $\pi(Y_{Z*})$ to also utilize at least one of $\pi(Y_{Z*})=F\{\text{average}(n_{ijZ*})\}$ and $\pi(Y_{Z*})=\text{average}\{F(n_{ijZ*})\}$, wherein:

$\pi(Y_{ijZ*})$ denotes one of $\pi(Y_{ijZ*})=\pi(M_{ijZ*})$ and $\pi(Y_{ijZ*})=\pi(S_{ijZ*})$ $\pi(Y_{Z*})$ denotes one of $\pi(Y_{Z*})=\pi(M_{Z*})$ and $\pi(Y_{Z*})=\pi(S_{Z*})$;

Z denotes a specifically selected variable $K_r$;

said variable Z and said specifically selected variable $K_r$ directly denote a specifically selected phenomenon;

Z* denotes a specifically selected value of variable Z;

$\pi(M_{ijZ*})$ denotes an individualized specific probability of mortality of individual i at situation j and at a specifically selected value Z* of variable Z;

$\pi(S_{ijZ*})$ denotes an individualized specific probability of survivorship of individual i at situation j and at a specifically selected value Z* of variable Z;

$\pi(M_{Z*})$ denotes an averaged specified probability of mortality at a specifically selected value Z* of variable Z;

$\pi(S_{Z*})$ denotes an averaged specified probability of survivorship at a specifically selected value Z* of variable Z;

$\beta_v Z^*$ denotes a replacement of a $\beta_v X_{vij}$ in said model $n_{ijZ*}=\beta_0+\beta_v X_{vij}+\ldots+\beta_W X_{Wij}$, wherein variable $K_r$ in $X_{vij}=T_q(K_{rij})$ is said specific variable $K_r$ that is denoted by Z, and wherein $X_{vij}=T_q(Z_{ij})$ for said replaced $\beta_v X_{vij}$;

$\Sigma\beta_v Z^*$ denotes the sum of all respective $\beta_v Z^*$ replacements of respective $\beta_v X_{vij}$ in said model $n_{ij}=\beta_0+\beta_v X_{vij}+\ldots+\beta_W X_{Wij}$;

$X_{vij\sim Z}$ denotes an $X_{vij}$ wherein variable $K_r$ in $X_{vij}=T_q(K_{rij})$ is not said specific variable $K_r$ that is denoted by Z;

$\Sigma\beta_v X_{vij\sim Z}$ denotes the sum of all $\beta_v X_{vij\sim Z}$ in said model $n_{ij}=\beta_0+\beta_v X_{vij}+\ldots+\beta_W X_{Wij}$;

$F(\cdot)$ denotes a cumulative distribution function of $(\cdot)$;

said cumulative distribution function $F(\cdot)$ corresponds to said binary link function $B(n_{ij})$;

average $(n_{ijZ*})$ denotes an average of the respective $n_{ijZ*}$ of at least two individuals i at situation j and at a specifically selected value Z* of variable Z; and average $\{F(n_{ijZ*})\}$ denotes an average of the respective $F(n_{ijZ*})$ of at least two individuals i at a situation j and at a specifically selected value Z* of variable Z.

8. The system of claim 6 further comprising a plurality of local or remote devices connected through one or more networks.

9. In the system of claim 7, said processor further configured to at least one of specify and plot at least one of the following: $\pi(Y_{ijZ})$, $\pi(Y_Z)$, $\pi(MS_{ijZ})$, $\pi(MS_Z)$, $\pi(MS_{ijZ+})$, and $\pi(MS_{Z+})$; wherein:

$\pi(Y_{ijZ})$ denotes one of $\pi(Y_{ijZ})=\pi(M_{ijZ})$ and $\pi(Y_{ijZ})=\pi(S_{ijZ})$;

$\pi(Y_Z)$ denotes one of $\pi(Y_Z)=\pi(M_Z)$ and $\pi(Y_Z)=\pi(S_Z)$;

$\pi(M_{ijZ})$ denotes the $\pi(M_{ijZ*})$ of an individual i at a situation j and at at least two specifically selected Z* values of variable Z;

$\pi(S_{ijZ})$ denotes the $\pi(S_{ijZ*})$ of an individual i at a situation j and at at least two specifically selected Z* values of variable Z;

$\pi(M_Z)$ denotes the $\pi(M_{Z*})$ of individuals i at a situation j and at at least two specifically selected Z* values of variable Z;

$\pi(S_Z)$ denotes at least two $\pi(S_{Z*})$ of individuals i at a situation j and at at least two specifically selected Z* values of variable Z;

$\pi(MS_{ijZ})$ denotes corresponding $\pi(M_{ijZ})$ and $\pi(S_{ijZ})$ at at least two specifically selected Z* values of variable Z;

$\pi(MS_Z)$ denotes corresponding $\pi(M_Z)$ and $\pi(S_Z)$ at at least two specifically selected Z* values of variable Z;

$\pi(MS_{ijZ+})$ denotes corresponding $\pi(MS_{ijZ})$ at at least two specifically selected Z* values of a variable Z and at respective at least two specifically selected Z* values of each of at least one other variable Z; and $\pi(MS_{Z+})$ denotes corresponding $\pi(MS_Z)$ at at least two specifically selected Z* values of a variable Z and at respective at least two specifically selected Z* values of each of at least one other variable Z.

10. The system of claim 7 further comprising a plurality of local or remote devices connected through one or more networks.

11. The system of claim 9 further comprising a plurality of local or remote devices connected through one or more networks.

12. The system of claim 5 further comprising a plurality of local or remote devices connected through one or more networks.

13. A computer program product for including and distinguishing lifespan in multivariable binary regression analysis of one of mortality and survivorship, said computer program product stored in a non-transitory computer storage medium, said storage medium storing at least one of data and instructions for processing by a processor, said instructions comprising:

instructions to at least one of obtain and create data about N individuals i at respective J situations j, said data to include variable $Y_{ij}$ and at least two variables $X_{vij}$;

instructions to conduct a multivariable binary regression analysis of said data, said analysis to analyze the relationship between a dependent variable $Y_{ij}$ and independent variables $X_{vij}$ for one of $Y_{ij}=M_{ij}$ and $Y_{ij}=S_{ij}$, said analysis to utilize model $n_{ij}=\beta_0+\beta_v X_{vij}+ \ldots +\beta_W X_{Wij}$ and binary link function $B(n_{ij})$;

instructions to effectuate said multivariable binary regression analysis to yield at least one result of said analysis; and wherein:

i=1:N, indicating that i are sequential positive integers 1 through N;

i denotes an individual;

N denotes the total number of individuals i in said data;

j=1:J, indicating that j are sequential positive integers 1 through J;

j denotes a situation of individual i in reference to said variables $X_{vij}$ and $Y_{ij}$;

J denotes the total number of situations of an individual i in said data, allowing distinct J for distinct individuals i;

$M_{ij}$ denotes the mortality status of individual i at situation j;

$S_{ij}$ denotes the survivorship status of individual i at situation j;

$Y_{ij} \in \{0,1\}$, indicating that $Y_{ij}$ is a binary variable that adopts one of values 0 and 1 for one of $Y_{ij}=M_{ij}$ and $Y_{ij}=S_{ij}$ of individual i at situation j;

v=1:W, indicating that v are sequential positive integers 1 through W;

$W \geq 2$;

v denotes an index of each of the following: variables $X_v$, variables $X_{vij}$ of individual i at situation j, and coefficients $\beta_v$;

W denotes the following: total number of variables $X_v$, total number of variables $X_{vij}$ of individual i at situation j, and total number of coefficients $\beta_v$;

$X_{vij}$ denotes a variable $X_v$ of individual i at situation j;

r=1:R, indicating that r are sequential positive integers 1 through R;

$R \geq 2$;

$W \geq R$;

r denotes an index of each of the following: variables $K_r$ and variables $K_{rij}$;

$K_r$ denotes a variable that directly denotes a distinct phenomenon, and R respective variables $K_r$ respectively directly denote R distinct phenomena;

$K_{rij}$ denotes a variable $K_r$ of individual i at situation j;

T denotes a transformation function, allowing identity transformation;

q=1:Q, indicating that q are sequential positive integers 1 through Q;

$X_v=T_q(K_r)$;

$X_{vij}=T_q(K_{rij})$;

Q denotes the total number of transformations $T_q(K_r)$ for a specific $K_r$, and Q also denotes the the total number of transformations $T_q(K_{rij})$ for a specific $K_{rij}$ of individual i at situation j, allowing distinct Q for distinct variables $K_r$, and allowing distinct Q for distinct variables $K_{rij}$ of individual i at situation j;

R denotes the following: the total number of variables $K_r$, the total number of variables $K_{rij}$ of individual i at situation j, the total number of phenomena denoted by variables $K_r$, and the total number of phenomena denoted by variables $K_{rij}$ of individual i at situation j;

A directly denotes age;

L directly denotes lifespan;

$K_1=A$ and $K_2=L$, indicating that one of at least two variables $K_r$ directly denotes age, and indicating that another of said at least two variables $K_r$ directly denotes lifespan;

$K_{1ij}=A_{ij}$ and $K_{2ij}=L_{ij}$, indicating that one of at least two variables $K_{rij}$ directly denotes the age of individual i at situation j, and indicating that another of said at least two variables $K_{rij}$ directly denotes the lifespan of individual i at situation j;

$\beta$ denotes a regression coefficient; and $\beta_0$ denotes the regression coefficient for the intercept, allowing $\beta_0$ to be one of the following: estimated, suppressed, and user-provided.

14. In the computer program product of claim 13, said instructions further comprising instructions to estimate $\pi(Y_{ij})$ for one of $\pi(Y_{ij})=\pi(M_{ij})$ and $\pi(Y_{ij})=\pi(S_{ij})$, said estimating to utilize $\pi(Y_{ij})=F(n_{ij})$, wherein:

$\pi(M_{ij})$ denotes the probability of mortality of individual i at situation j;

$\pi(S_{ij})$ denotes the probability of survivorship of individual i at situation j;

$n_{ij}$ denotes $n_{ij}$ resulting from said multivariable binary regression analysis;

$F(n_{ij})$ denotes the cumulative distribution function of $n_{ij}$; and function $F(n_{ij})$ corresponds to function $B(n_{ij})$.

15. In the computer program product of claim 14, said instructions further comprising instructions to estimate at least one of $\pi(Y_{ijZ*})$ and $\pi(Y_{Z*})$, said estimating of at least one of $\pi(Y_{ijZ*})$ and $\pi(Y_{Z*})$ to utilize $n_{ijZ*}=\beta_0+\Sigma\beta_v Z^*+\Sigma\beta_v X_{vij\sim Z}$, said estimating of $\pi(Y_{ijZ*})$ to also utilize $\pi(Y_{ijZ*})=F(n_{ijZ*})$, and said estimating of $\pi(Y_{Z*})$ to also utilize at least one of $\pi(Y_{Z*})=F\{average(n_{ijZ*})\}$ and $\pi(Y_{Z*})=average\{F(n_{ijZ*})\}$, wherein:

$\pi(Y_{ijZ*})$ denotes one of $\pi(Y_{ijZ*})=\pi(M_{ijZ*})$ and $\pi(Y_{ijZ*})=\pi(S_{ijZ*})$ $\pi(Y_{Z*})$ denotes one of $\pi(Y_{Z*})=\pi(M_{Z*})$ and $\pi(Y_{Z*})=\pi(S_{Z*})$;

Z denotes a specifically selected variable $K_r$;

said variable Z and said specifically selected variable $K_r$ directly denote a specifically selected phenomenon;

$Z^*$ denotes a specifically selected value of variable Z;

$\pi(M_{ijZ*})$ denotes an individualized specific probability of mortality of individual i at situation j and at a specifically selected value $Z^*$ of variable Z;

$\pi(S_{ijZ*})$ denotes an individualized specific probability of survivorship of individual i at situation j and at a specifically selected value $Z^*$ of variable Z;

$\pi(M_{Z*})$ denotes an averaged specified probability of mortality at a specifically selected value $Z^*$ of variable Z;

$\pi(S_{Z*})$ denotes an averaged specified probability of survivorship at a specifically selected value $Z^*$ of variable Z;

$\beta_v Z^*$ denotes a replacement of a $\beta_v X_{vij}$ in said model $n_{ijZ*}=\beta_0+\beta_v X_{vij}+\ldots+\beta_W X_{Wij}$, wherein variable $K_r$ in $X_{vij}=T_q(K_{rij})$ is said specific variable $K_r$ that is denoted by Z, and wherein $X_{vij}=T_q(Z_{ij})$ for said replaced $\beta_v X_{vij}$;

$\Sigma\beta_v Z^*$ denotes the sum of all respective $\beta_v Z^*$ replacements of respective $\beta_v X_{vij}$ in said model $n_{ij}=\beta_0+\beta_v X_{vij}+\ldots+\beta_W X_{Wij}$;

$X_{vij\sim Z}$ denotes an $X_{vij}$ wherein variable $K_r$ in $X_{vij}=T_q(K_{rij})$ is not said specific variable $K_r$ that is denoted by Z;

$\Sigma\beta_v X_{vij\sim Z}$ denotes the sum of all $\beta_v X_{vij\sim Z}$ in said model $n_{ij}=\beta_0+\beta_v X_{vij}+\ldots+\beta_W X_{Wij}$;

$F(\cdot)$ denotes a cumulative distribution function of $(\cdot)$;

said cumulative distribution function $F(\cdot)$ corresponds to said binary link function $B(n_{ij})$;

average $(n_{ijZ*})$ denotes an average of the respective $n_{ijZ*}$ of at least two individuals i at situation j and at a specifically selected value $Z^*$ of variable Z; and average $\{F(n_{ijZ*})\}$ denotes an average of the respective $F(n_{ijZ*})$ of at least two individuals i at a situation j and at a specifically selected value $Z^*$ of variable Z.

16. In the computer program product of claim 15, said instructions further comprising instructions to at least one of specify and plot at least one of the following: $\pi(Y_{ijZ})$, $\pi(Y_Z)$, $\pi(MS_{ijZ})$, $\pi(MS_Z)$, $\pi(MS_{ijZ+})$, and $\pi(MS_{Z+})$; wherein:

$\pi(Y_{ijZ})$ denotes one of $\pi(Y_{ijZ})=\pi(M_{ijZ})$ and $\pi(Y_{ijZ})=\pi(S_{ijZ})$;

$\pi(Y_Z)$ denotes one of $\pi(Y_Z)=\pi(M_Z)$ and $\pi(Y_Z)=\pi(S_Z)$;

$\pi(M_{ijZ})$ denotes the $\pi(M_{ijZ*})$ of an individual i at a situation j and at at least two specifically selected $Z^*$ values of variable Z;

$\pi(S_{ijZ})$ denotes the $\pi(S_{ijZ*})$ of an individual i at a situation j and at at least two specifically selected $Z^*$ values of variable Z;

$\pi(M_Z)$ denotes the $\pi(M_{Z*})$ of individuals i at a situation j and at at least two specifically selected $Z^*$ values of variable Z;

$\pi(S_Z)$ denotes at least two $\pi(S_{Z*})$ of individuals i at a situation j and at at least two specifically selected $Z^*$ values of variable Z;

$\pi(MS_{ijZ})$ denotes corresponding $\pi(M_{ijZ})$ and $\pi(S_{ijZ})$ at at least two specifically selected $Z^*$ values of variable Z;

$\pi(MS_Z)$ denotes corresponding $\pi(M_Z)$ and $\pi(S_Z)$ at at least two specifically selected $Z^*$ values of variable Z;

$\pi(MS_{ijZ+})$ denotes corresponding $\pi(MS_{ijZ})$ at at least two specifically selected $Z^*$ values of a variable Z and at respective at least two specifically selected $Z^*$ values of each of at least one other variable Z; and $\pi(MS_{Z+})$ denotes corresponding $\pi(MS_Z)$ at at least two specifically selected $Z^*$ values of a variable Z and at respective at least two specifically selected $Z^*$ values of each of at least one other variable Z.

* * * * *